Sept. 9, 1947.  L. A. MOORE  2,427,223
SHEET CUTTING AND DELIVERY MEANS
Filed Dec. 4, 1944  12 Sheets-Sheet 10
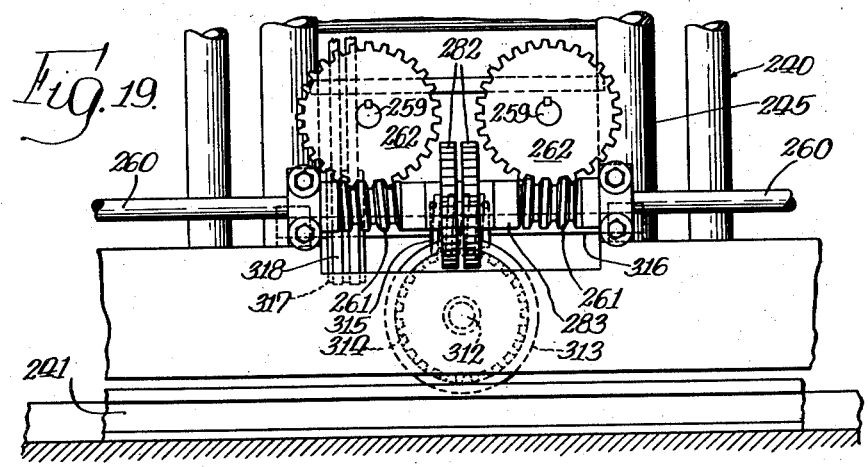
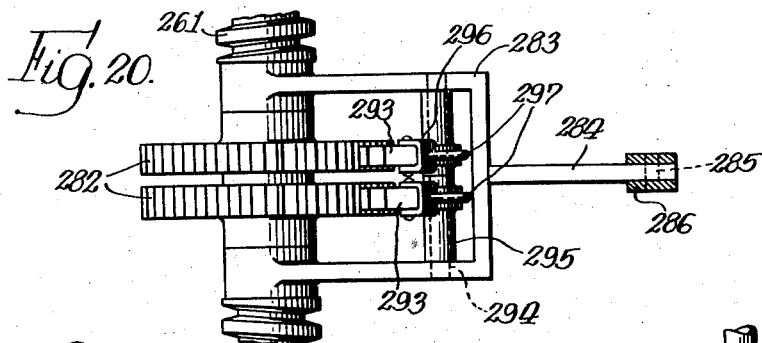
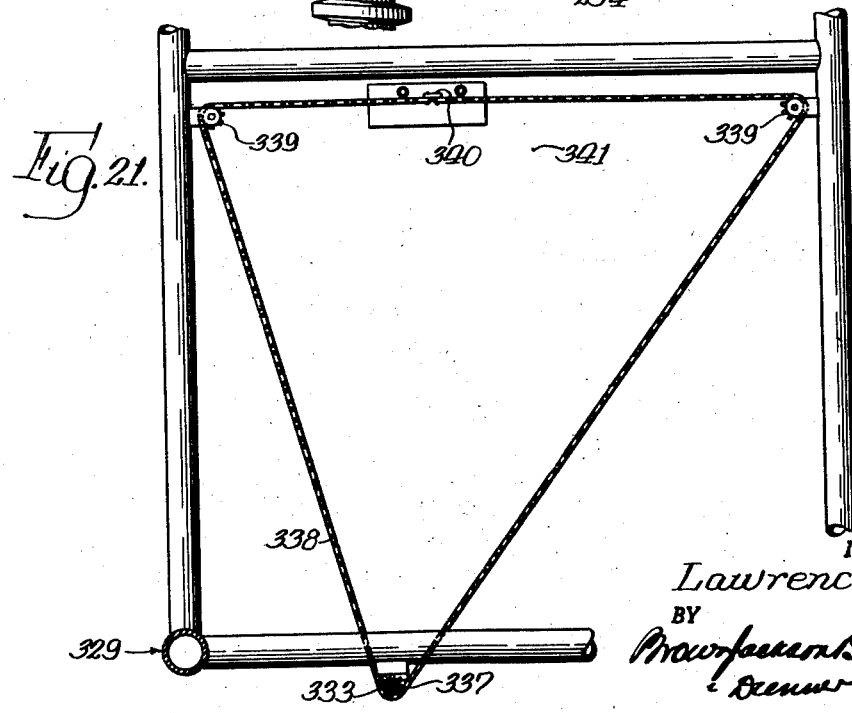
INVENTOR.
Lawrence A. Moore,
BY

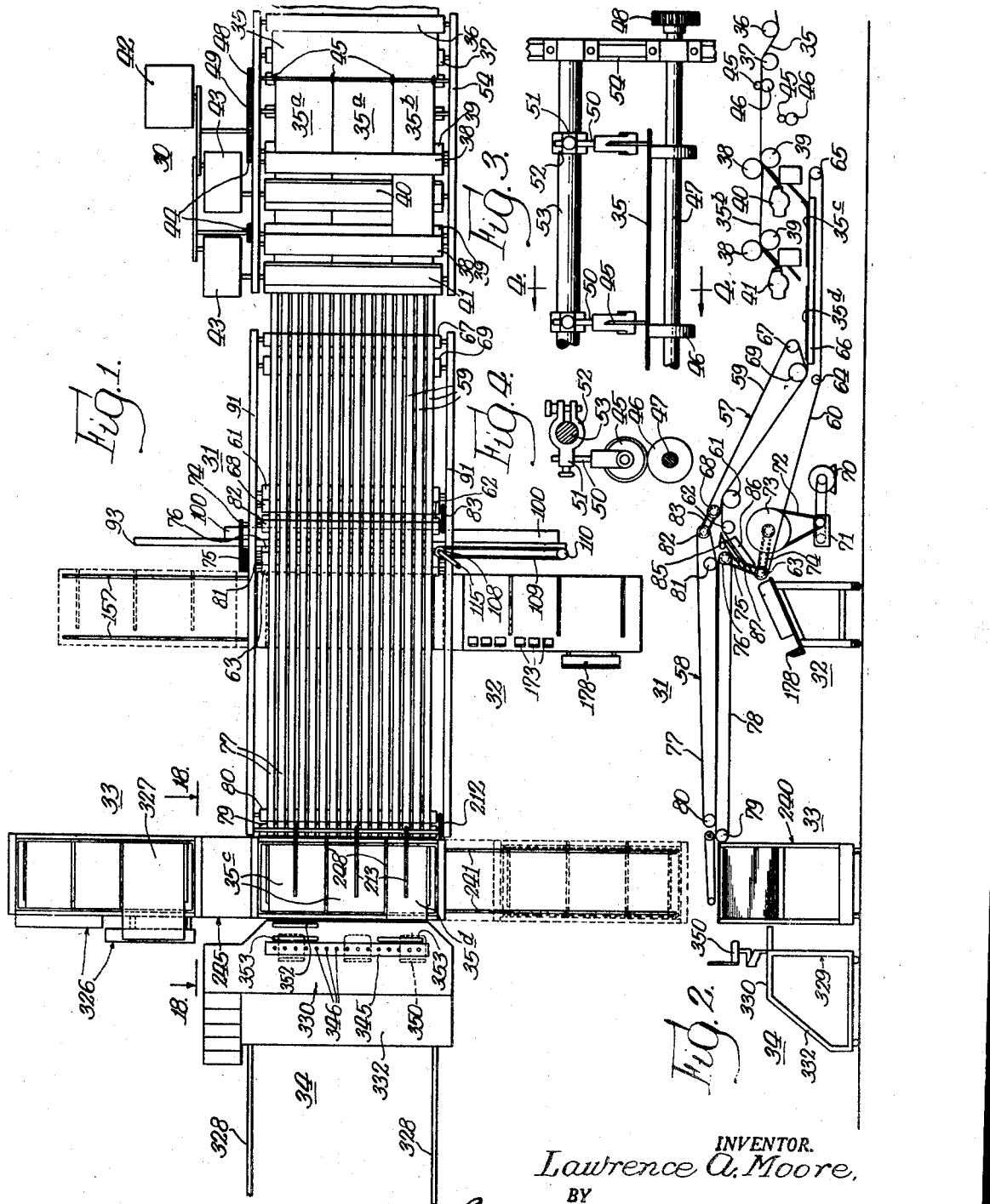

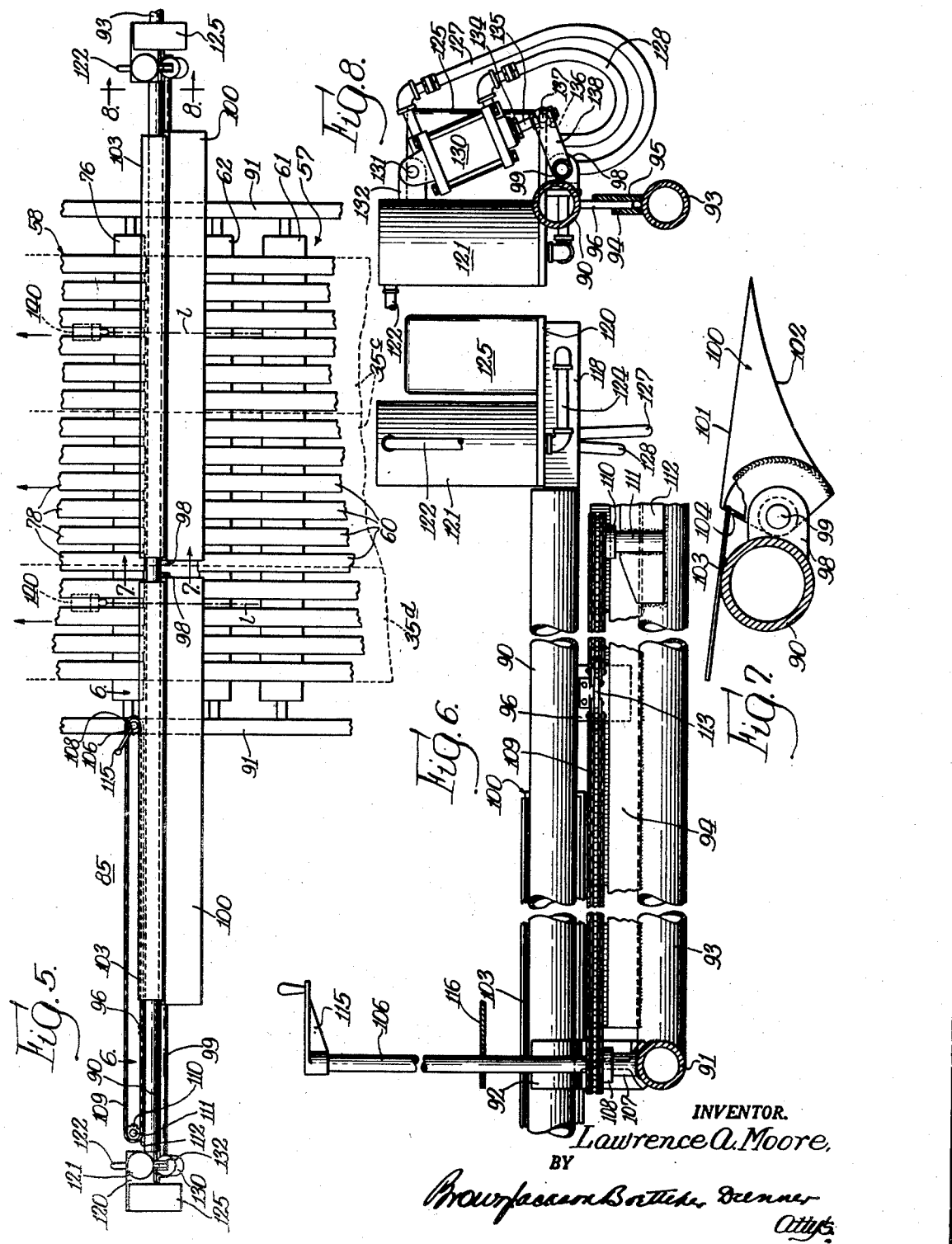

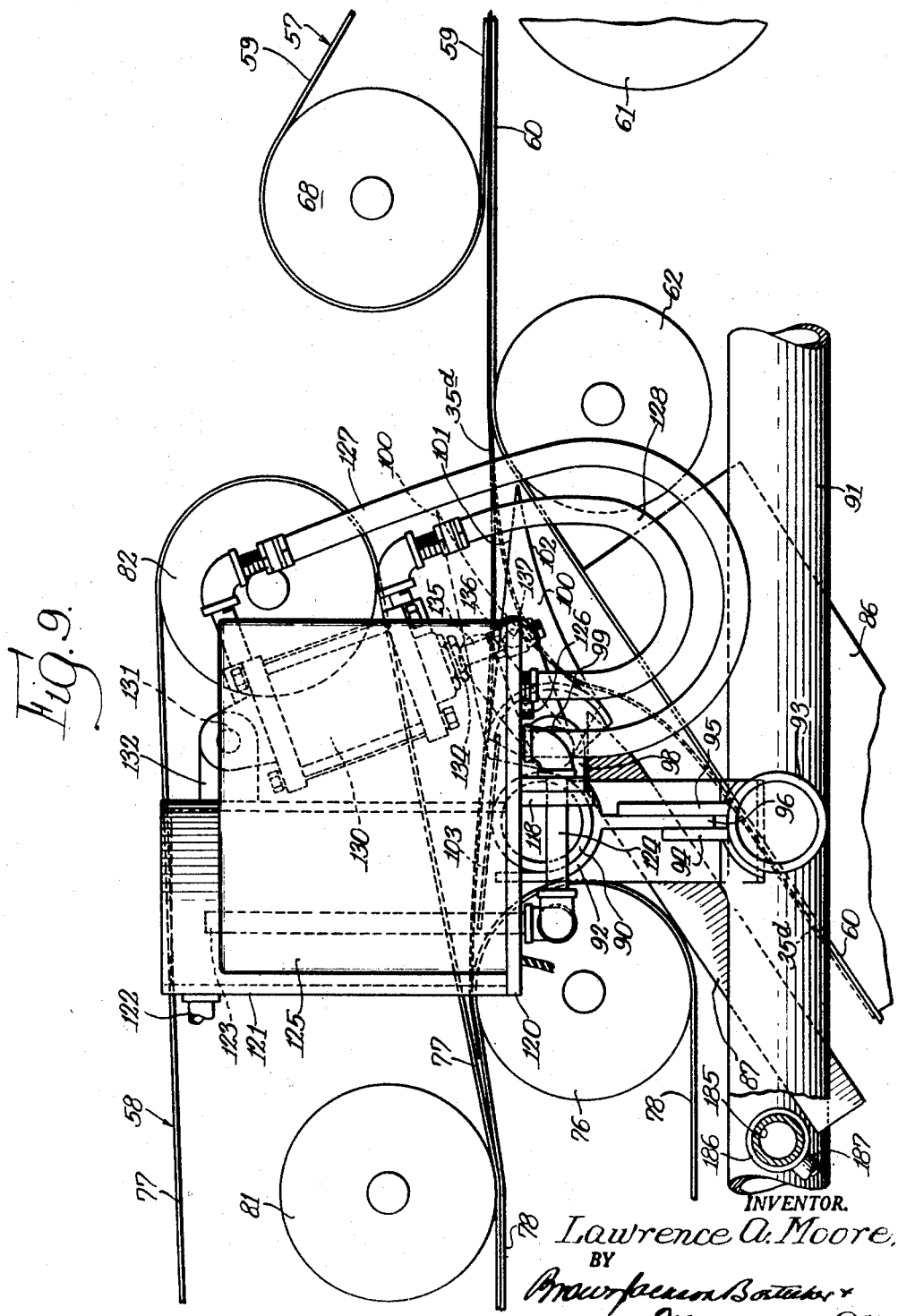

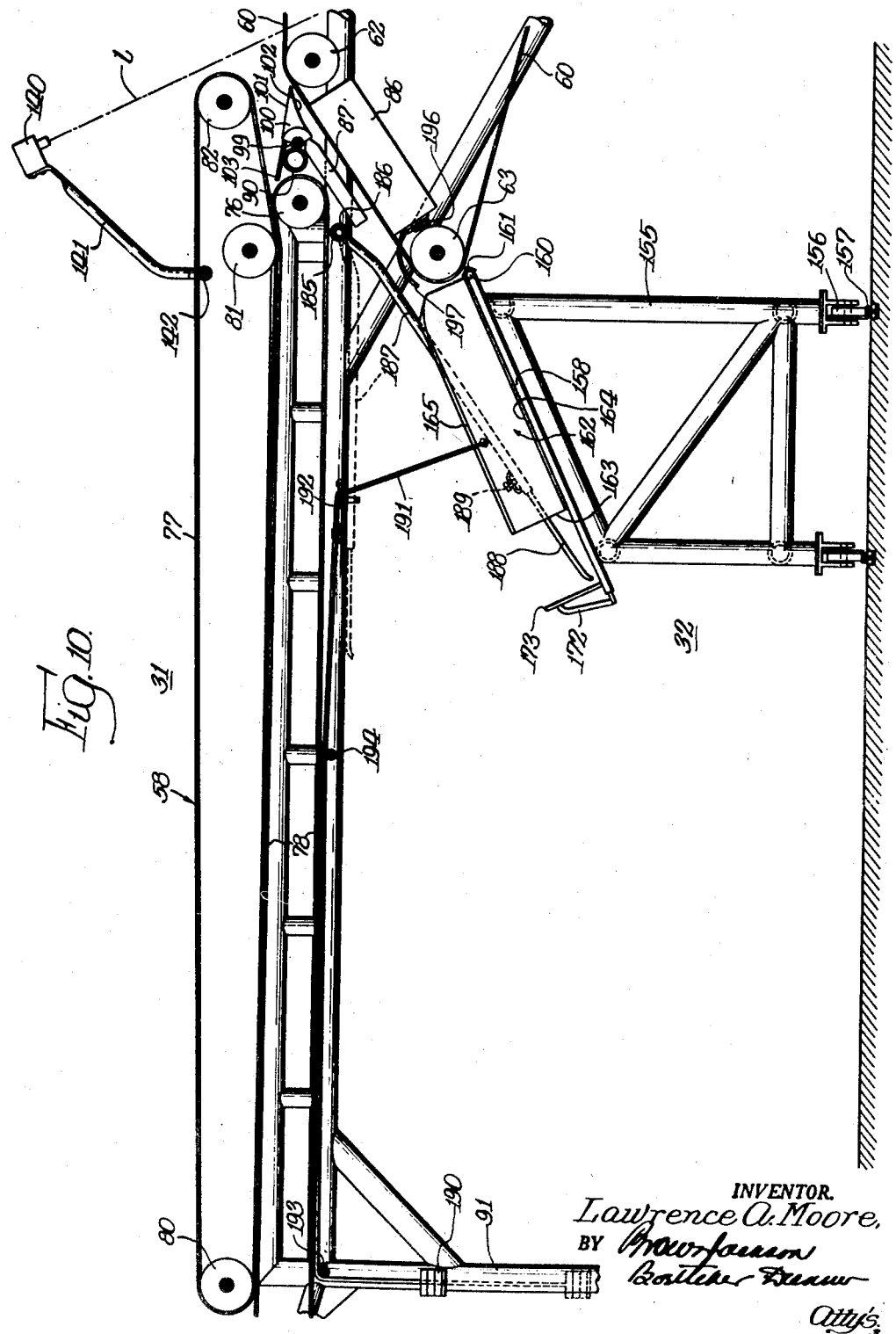

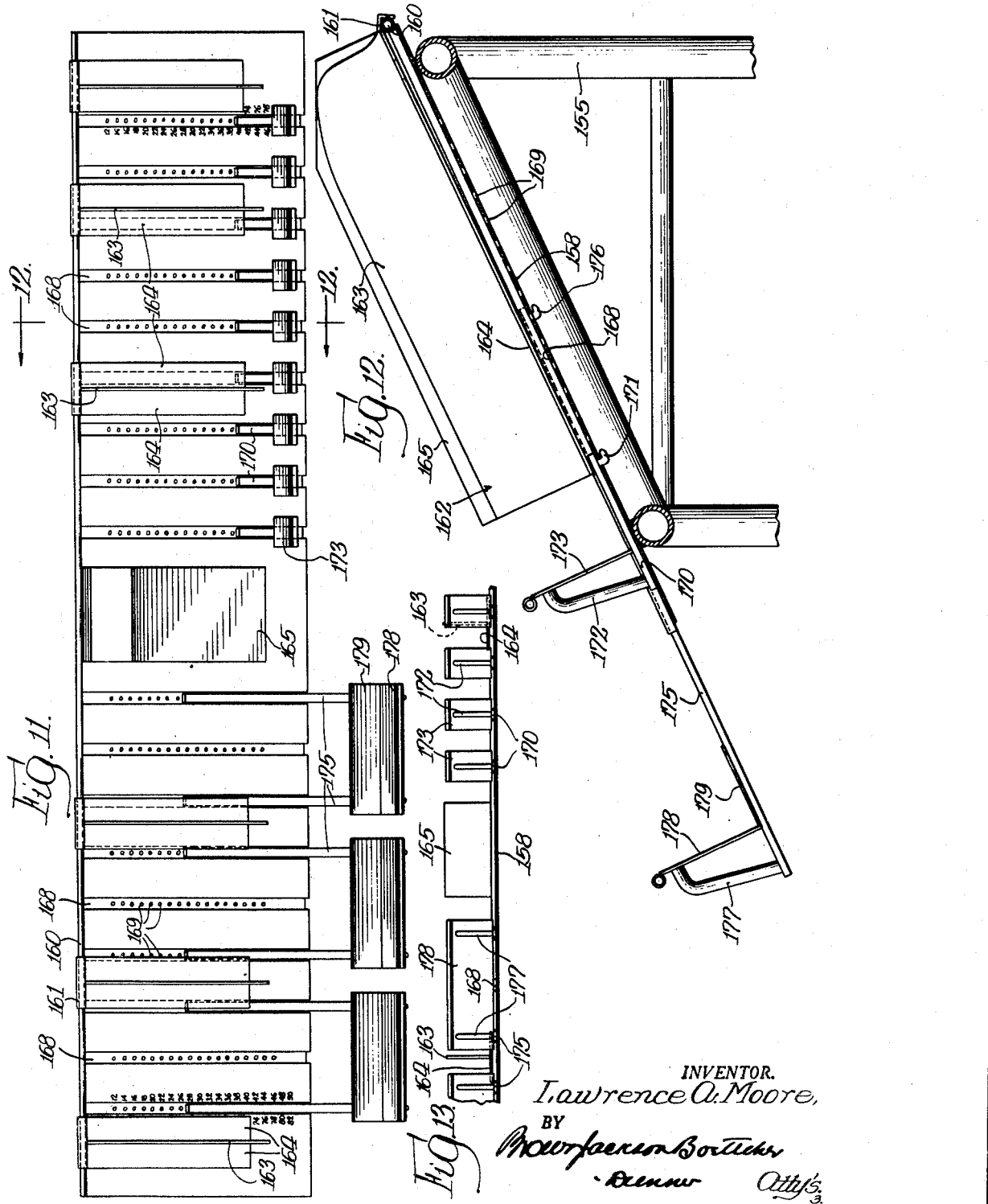

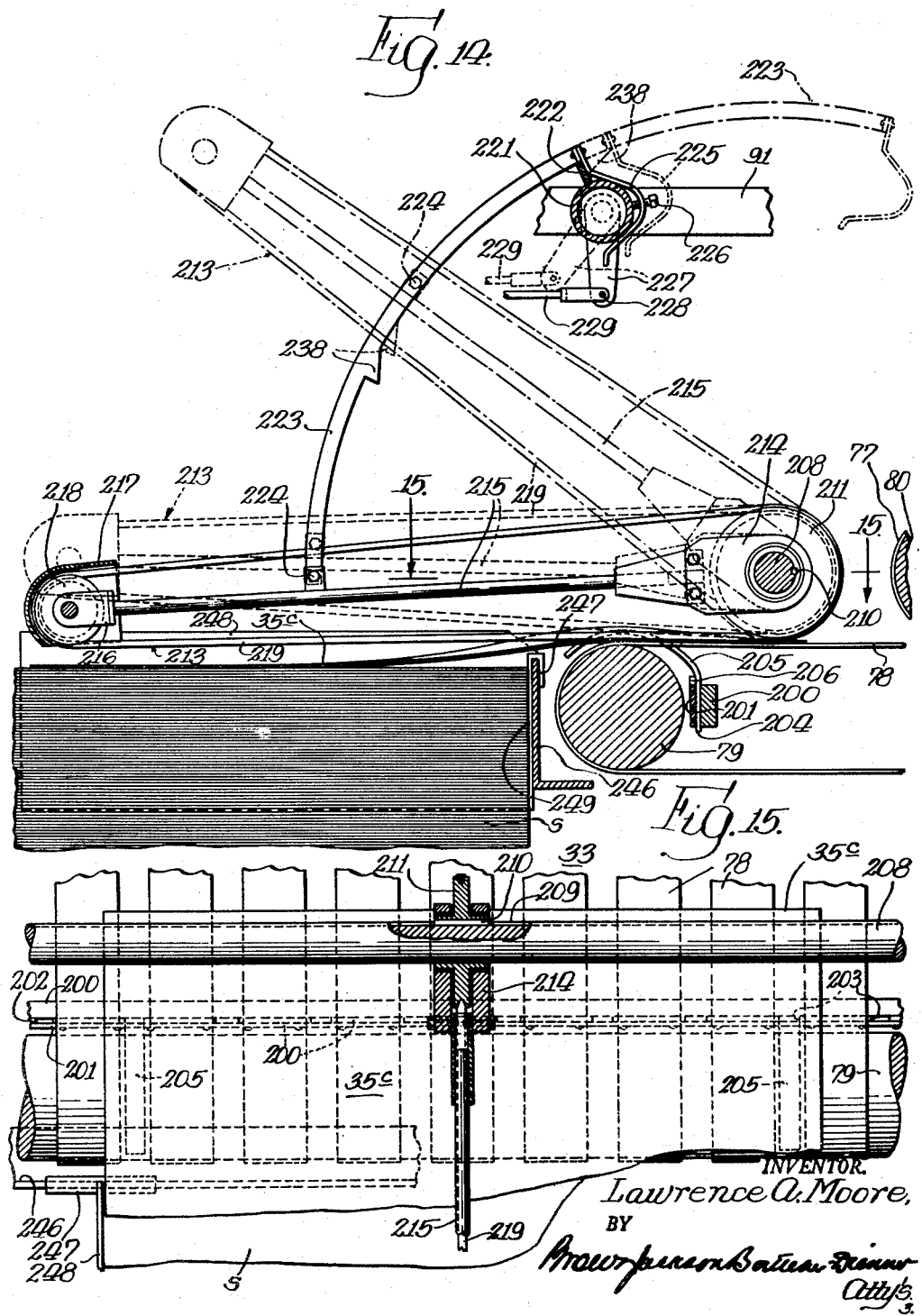

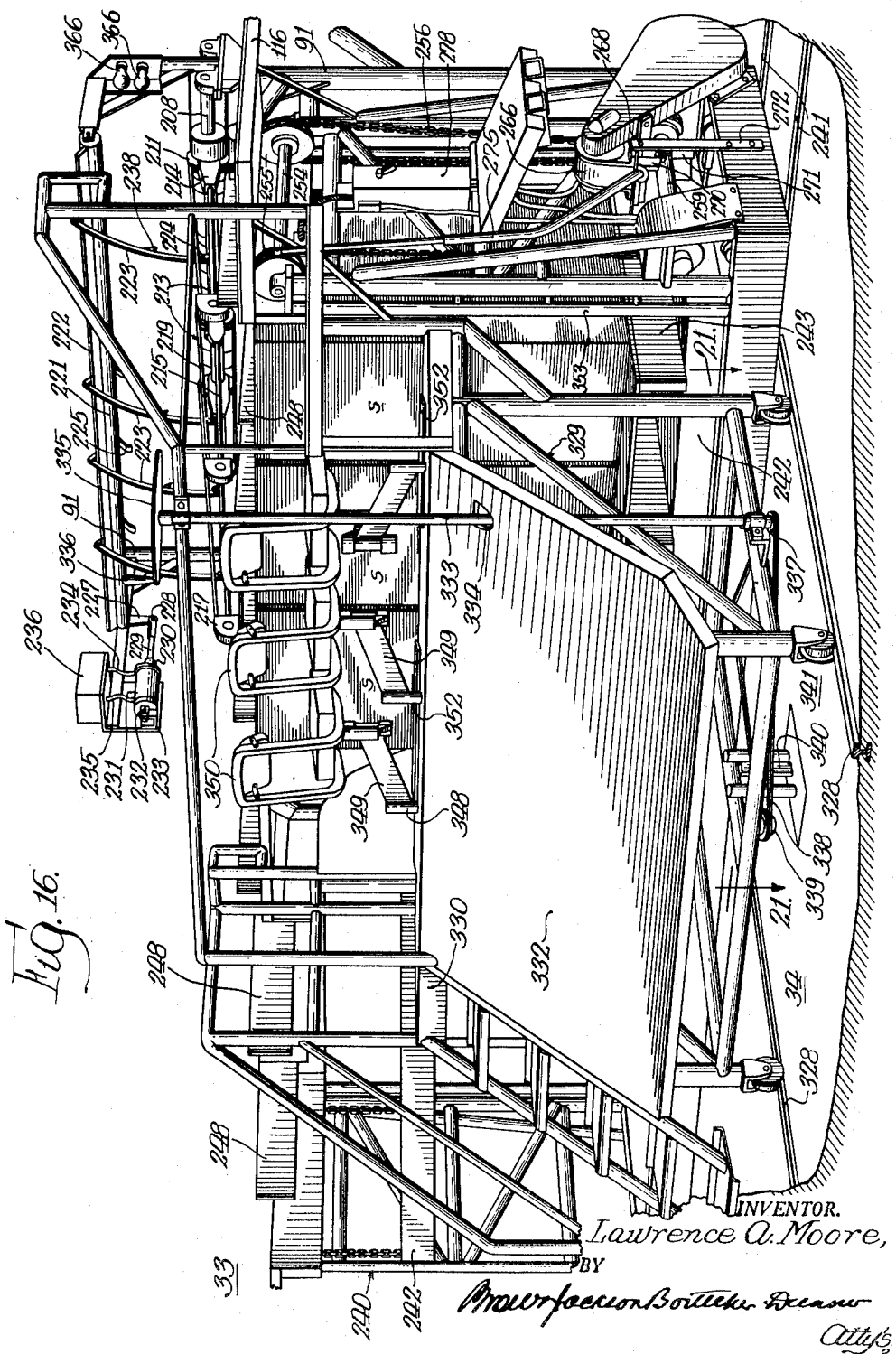

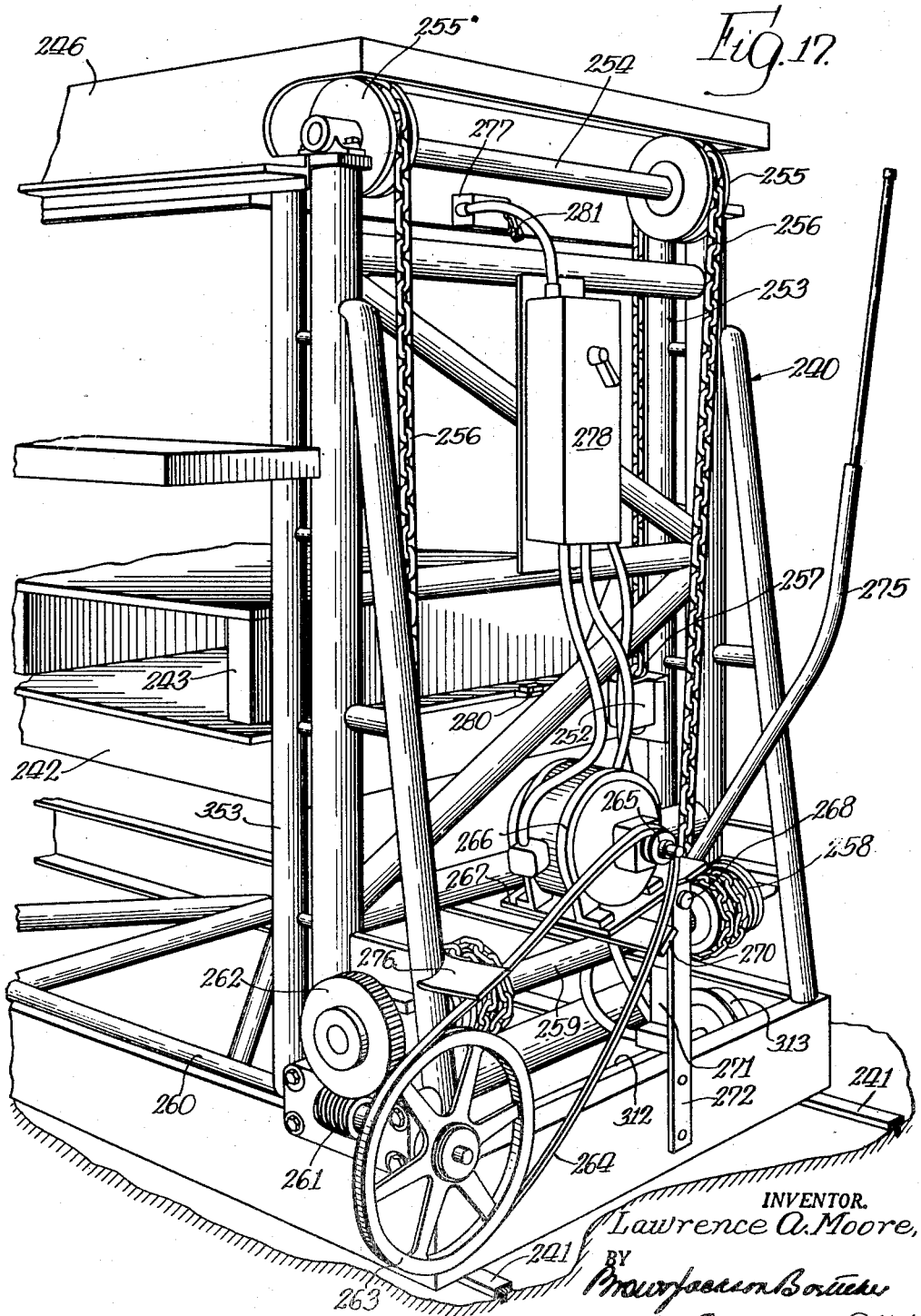

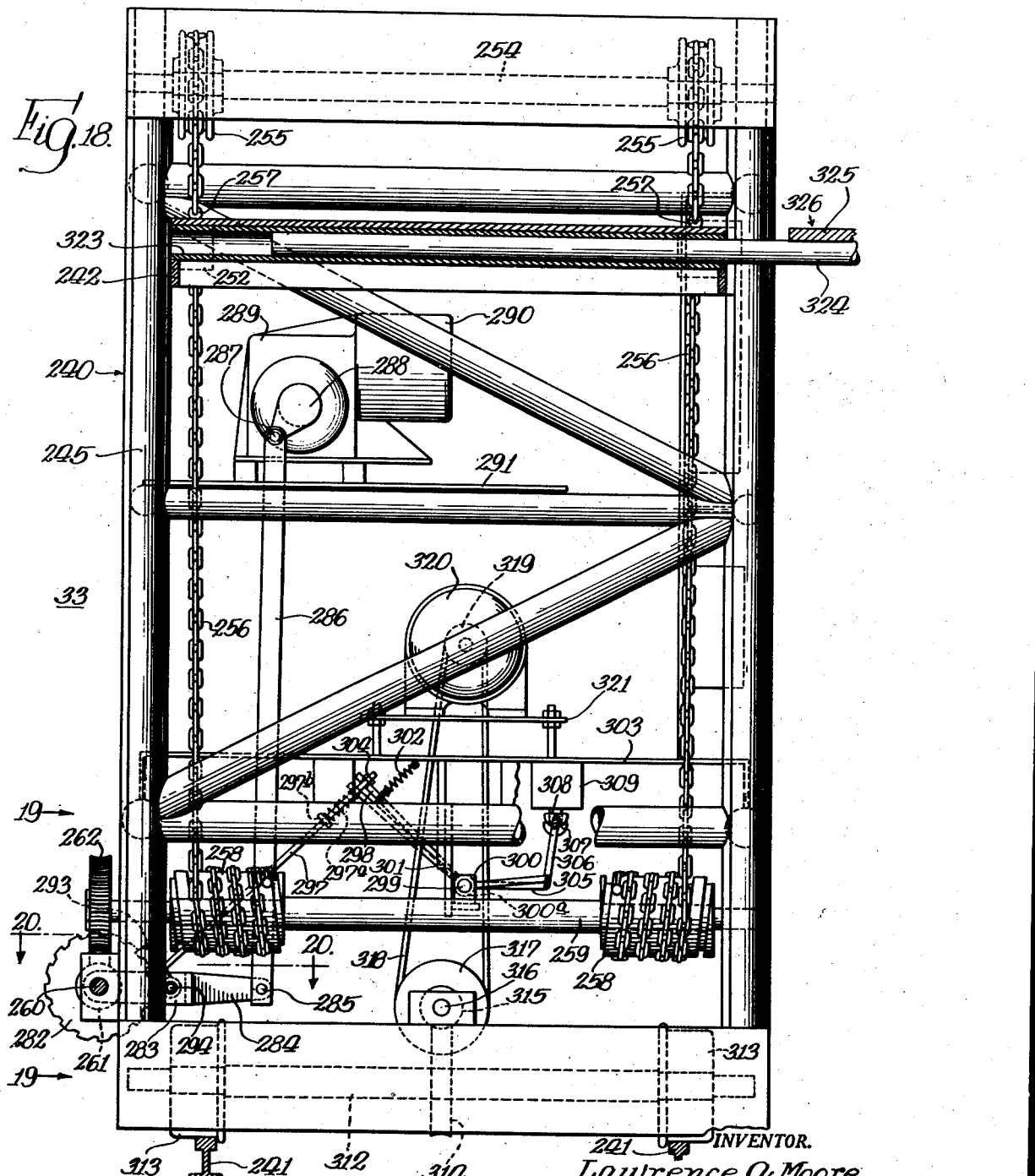

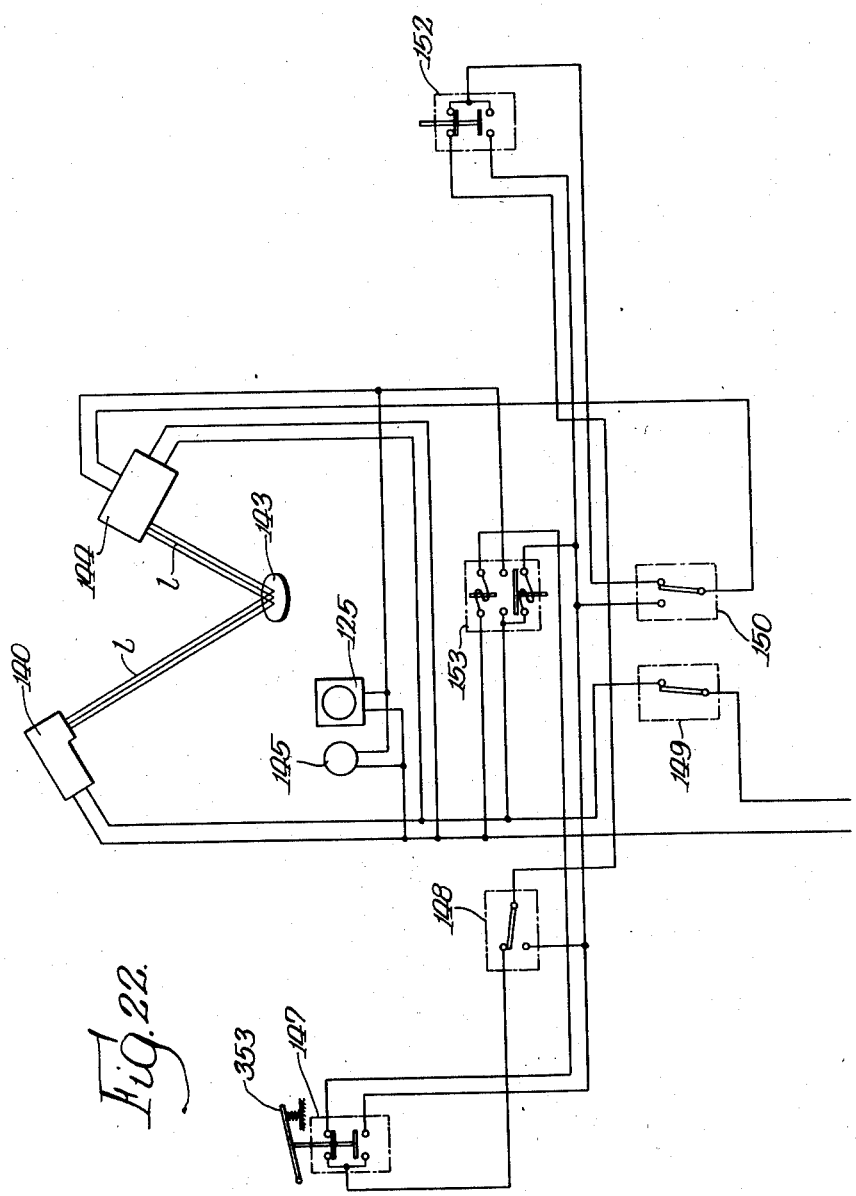

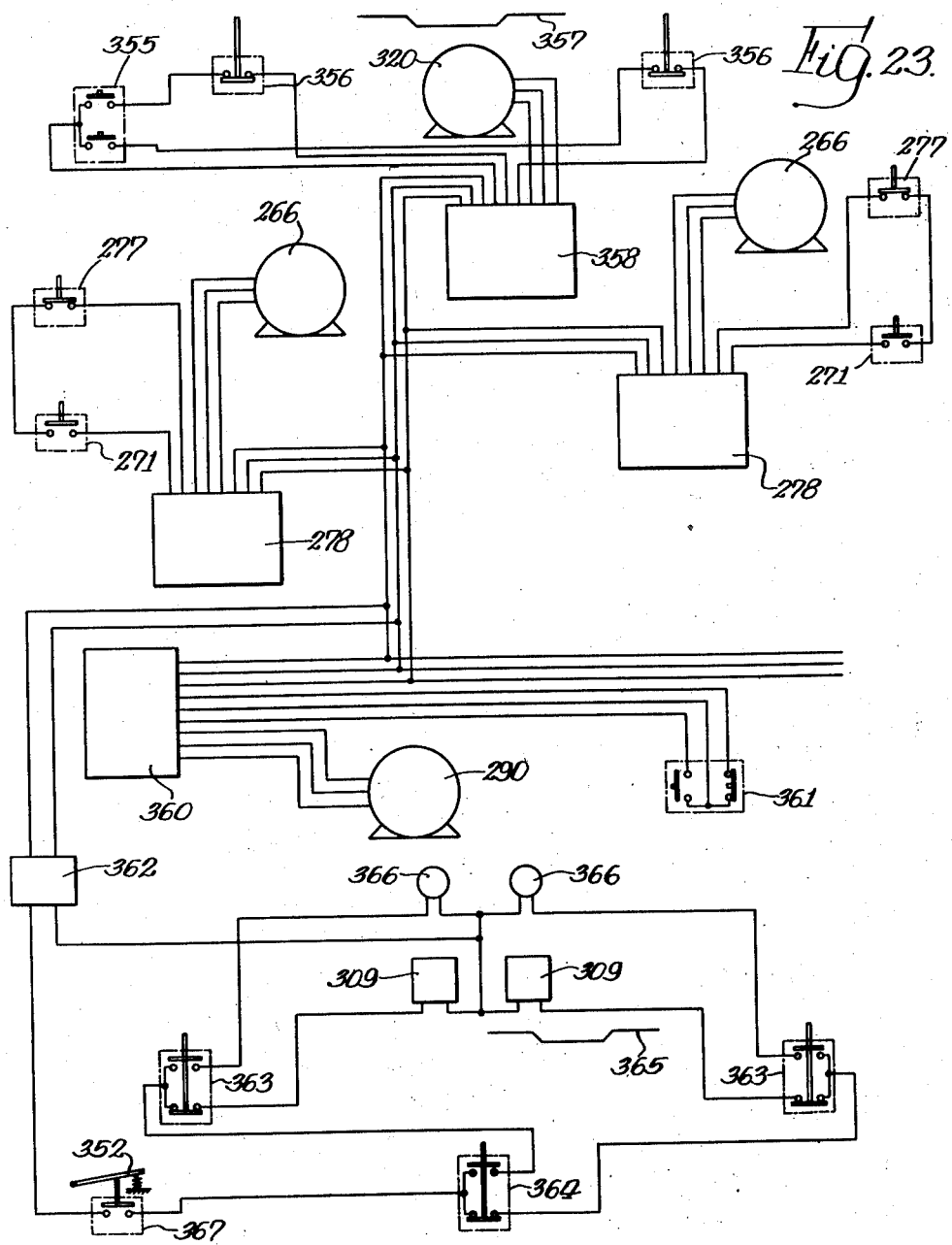

Patented Sept. 9, 1947

2,427,223

UNITED STATES PATENT OFFICE 2,427,223

SHEET CUTTING AND DELIVERY MEANS

Lawrence A. Moore, Elkhart, Ind., assignor to American Coating Mills, Inc., Elkhart, Ind., a corporation of Indiana Application December 4, 1944, Serial No. 566,559

41 Claims. (Cl. 164—68)

1

This invention relates to the production of paper and paper board in sheet form, and has to do with means for cutting a web of paper board into sheets of desired sizes and delivering the cut sheets to a desired point or station and there stacking them.

It is the accepted practice in the paper making industry, for reasons well understood in the art and which need not be discussed here, to operate a paper board making machine continuously, once it has been set into operation, the machine being stopped only when that is absolutely unavoidable, as for essential repairs or replacement of parts or like reasons, at which times the machine is completely shut down until the necessary repairs have been made and, usually, it has been overhauled. During operation of the machine, a continuously travelling web is delivered therefrom which, by appropriate treatment, including drying and calendering, becomes a continuously travelling web of finished paper board. The web of paper board may pass to suitable slitting and cutting means whereby it is cut into sheets of desired sizes, which are delivered to suitable receptacles, as in the Colbert et al. Patent No. 1,722,559. In this patent the cut sheets are delivered to compartments of a wheeled truck travelling on a track across the delivery end of the slitting and cutting means. The truck is of necessity rather heavy and cumbersome, and an appreciable time is required for shifting it, when one set of compartments becomes filled, into position to bring the other set of compartments into sheet receiving position.

From what has been said, it will be clear that the various apparatuses through which the web passes must operate continuously. Accordingly, during shifting of the truck, cut sheets are being discharged at the delivery end of the slitting and cutting means. Many of these sheets will not pass into the compartments of the truck, and must be discharged onto the floor, becoming unfit for their intended use and often being discarded to a considerable extent as waste. That inevitably incurs a considerable amount of waste, which is objectionable for obvious reasons. After the truck has been shifted, as above, the sheets deposited therein are removed by hand and restacked. That entails further labor and time with resultant added cost. Since the truck must pass beneath the delivery end of the slitting and cutting means, it necessarily is rather shallow, which requires frequent shifting of the truck and removal of the sheets therefrom, aggravating the conditions above referred to. Due to the neces-

2 sity of frequently shifting the truck, with resultant wastage during each shifting operation, the speed of operation of the slitting and cutting means must be such as to avoid prohibitive wastage. This means that the speed of the cooperating apparatuses, including the paper making machine must be correspondingly reduced or held down and, therefore, must be materially less than would be possible if the necessity for frequent shifting of the truck were eliminated.

My invention is directed to apparatus for receiving a continuously travelling web of paper board and cutting it into sheets of desired sizes and stacking the cut sheets, which apparatus avoids the objections to the known apparatuses briefly considered above. To that end, I provide carrier means for transporting the cut sheets from the slitting and cutting means and delivering them to vertically adjustable tables providing for stacks of considerable height whereby necessity for frequently shifting of the sheet receiving means is eliminated. The sheet receiving tables are carried by a lay boy adjustable transversely of the carrier means so as to bring either table selectively into sheet receiving position. I also provide a throw out table underlying the carrier means, and throw out means for optionally directing sheets from the carrier means to the throw out table, the latter having two areas which may be set up independently and selectively disposed in sheet receiving position, by adjustment of the throw out table transversely of the carrier means. The provision of the lay boy and the throw out table, both adjustable transversely of the carrier means, in conjunction with the throw out means, renders it possible to direct sheets from the carrier means to the throw out table during shifting of the lay boy, so that discharge of sheets onto the floor with resulting wastage is avoided. In that manner it is rendered practicable to operate the slitting and cutting means at materially increased speed, so that the machine as a whole, including the paper making machine and associated apparatuses, may be operated at correspondingly increased speed, rendering possible a material increase in production. Further objects and advantages of my invention will appear from the detail description.

In the drawings:

Figure 1 is a diagrammatic plan view of sheet cutting and delivery apparatus embodying my invention;

Figure 2 is a diagrammatic side view of the apparatus of Figure 1;

Figure 3 is a fragmentary front view, on an enlarged scale, of the web slitters and associated parts;

Figure 4 is a sectional view taken substantially on line 4—4 of Figure 3;

Figure 5 is a semi-diagrammatic plan view of the throw out blades and associated parts;

Figure 6 is a view taken substantially on line 6—6 of Figure 5, on an enlarged scale;

Figure 7 is a sectional view taken substantially on line 7—7 of Figure 5, on an enlarged scale;

Figure 8 is a sectional view taken substantially on line 8—8 of Figure 5, on an enlarged scale;

Figure 9 is an end view of one of the throw out blades and associated parts, on an enlarged scale, with certain parts omitted for clearness of illustration;

Figure 10 is a side view, on an enlarged scale, of the throw out table and the overlying portion of the carrier, and associated parts;

Figure 11 is a plan view, on a slightly reduced scale, of the throw out table of Figure 10;

Figure 12 is a sectional view taken substantially on line 12—12 of Figure 11, with certain parts shown in elevation, on an enlarged scale;

Figure 13 is a fragmentary front view of the throw out table of Figure 11;

Figure 14 is a transverse sectional view of the ejector shaft and the ejector holding and adjusting bar and associated parts, on an enlarged scale;

Figure 15 is a sectional view taken substantially on line 15—15 of Figure 14, certain parts being shown in plan;

Figure 16 is a perspective side view, on an enlarged scale, of the catcher's platform and the lay boy and associated parts at the delivery end of the carrier;

Figure 17 is a perspective side view of the lay boy, on an enlarged scale;

Figure 18 is a transverse vertical sectional view of the lay boy, on an enlarged scale, taken substantially on line 18—18 of Figure 1;

Figure 19 is a fragmentary back view of the lower central area of the lay boy, with the gear housing removed, showing the gearing for raising and lowering the lay boy tables, taken substantially on line 19—19 of Figure 18;

Figure 20 is a sectional view, on an enlarged scale, taken substantially on line 20—20 of Figure 18, showing in plan the table lowering ratchet wheels and pawls;

Figure 21 is a sectional view taken substantially on line 21—21 of Figure 16;

Figure 22 is a diagram of the throw out control circuits; and

Figure 23 is a diagram of the lay boy operating and control circuits.

The apparatus of my invention comprises five main units—a web slitting and cutting unit 30, a carrier 31, a throw out table 32, a lay boy 33 and a sheet catcher's platform 34. The unit 30 receives the continuously travelling web of paper board 35 from the final calendering rolls (not shown) and may be similar to the slitting and cutting machine of the above identified Colbert et al. patent. It comprises guide rolls 36 and 37 over which the web 35 is drawn by two sets of coacting draw rolls 38 and 39, one set of the latter rolls delivering the strips of paper board, into which the web 35 has been separated by slitting means to be described presently, to a first cut-off knife 40 and the other set or pair of draw rolls 38 and 39 delivering the strips of paper board to a second cut-off knife 41, selectively. The cut-off knives are driven from a common motor 42, through individual variable speed mechanisms 43 of known type, such as a Reeves variable speed mechanism. The lower roll 39 of each pair of draw rolls is driven by motor 42 at predetermined uniform speed, conformably to the rate of travel of web 35, through suitable known means indicated by the gearing 44. The upper roll 38 is not driven and is urged toward roll 39 in a suitable known manner, cooperating therewith to grip the web 35, or the strips into which the web has been slit lengthwise, by means to be described presently. It will be seen that the web 35, or the strips, as the case may be, is advanced at uniform speed by the draw rolls, and that the cut-off knives 40 and 41 are driven independently and at variable speed.

Slitting means, comprising slitter discs 45, is disposed between the guide rolls 36 and 37 and the first pair of draw rolls 38 and 39. The discs 45 coact with rollers 46, commonly termed blocks, secured on a rotatably mounted cross shaft 47 having secured on one end thereof a pinion 48 which in the operative position of the slitting means, may be driven from the lower roll 39 of the first or rearward pair of draw rolls in any suitable manner, as by means of the gearing 49. The web 35 of paper board passes over the blocks 46, as shown in Figure 3, and is slit lengthwise into strips, as indicated in Figure 1. The discs 45 are adjusted vertically by suitable known means, the shanks 50 of the disc holders passing through bosses 51 of split clamps 52 secured upon a cross rod 53 mounted with shaft 47 in an adjustable bracket structure 54. It will be seen that the slitter discs 45 may be adjusted lengthwise of rod 53 for slitting the webs 35 into strips of desired width, it being understood that the blocks 46 are also suitably mounted upon shaft 47 for relative adjustment lengthwise thereof. The discs 45 and blocks 46 and associated parts together constitute one set of slitters which, in practice is properly adjusted for trimming off the edges of web 35 and slitting the latter lengthwise into strips. In practice, there are two sets of slitters, as indicated in Figure 2, and suitable means is provided whereby either set may be moved into operative position and the other set moved into inoperative position. When it is desired to change the setting of the slitters, the set not in use is adjusted for slitting the web 35 into the desired widths of strips and, after this adjustment has been made, the web 35 is broken between the final calendering rolls and the guide roll 36, the newly adjusted set of slitters is moved into operative position and the other set of slitters is moved into inoperative position, after which the web is threaded into the unit 30 which then operates as before.

In Figure 1 I have shown the web 35 as being slit lengthwise into three strips, two 35ᵃ of which are of the same width and the third 35ᵇ of which is of materially less width than the strips 35ᵃ. The two strips 35ᵃ are led from the first set of draw rolls 38 and 39 to the first cut-off knife 40, by which these strips are cut into sheets 35ᶜ of desired length. The strip 35ᵇ is led from the first set of draw rolls to the second set and thence to the second cut-off knife 41, by which this strip is cut into sheets 35ᵈ of desired length. By driving the first cut-off knife at higher speed than the second cut-off knife, the strips 35ᵃ may be cut into sheets 35ᶜ of less length than the sheets 35ᵈ cut from strip 35ᵇ, as indicated in Figures 1 and 2. It is thus possible, by varying the rate of drive of the cut-off knives, to cut sheets of different lengths as well as of different widths, and the lengths of the sheets cut by the two knives may vary greatly depending upon the relative rate of drive thereof, as will be understood.

The carrier 31 comprises a receiving conveyor 57 and a delivery conveyor 58 disposed to receive the cut sheets from the conveyor 57 and transport them to the lay boy 33. The receiving conveyor has an upper set of tapes 59 and a cooperating lower set of tapes 60 between which the cut sheets are gripped and conveyed. The lower set of tapes 60 pass about suitably disposed rolls 61, 62, 63, 64, and 65, the last roll being disposed rearward beyond the first or rearward cut-off knife 40 and in back of a suction box 66. The upper tapes 59 of conveyor 57 pass about suitably disposed rolls 67, 68 and 69, the latter roll being positioned adjacent the front of suction box 66. The upper run of the tapes 60 travel forward along the top of suction box 66, thence under roll 69 in contact with the lower run of the tapes 59 and upward over roll 61, then passing therefrom forwardly over roll 62 and from the latter downward and forward about roll 63 and thence under roll 64 and from the latter rearward to roll 65. Roll 63 is driven by a motor 70, through a variable speed mechanism 71, such as a Reeves mechanism previously referred to, the latter having driving connection by a belt 72 to a pulley 73 having a chain and sprocket drive 74 to roll 63. The latter roll has a chain and sprocket drive 75 to lower rearward roll 76 of delivery conveyor 58, this conveyor having an upper set of tapes 77 and a lower set of tapes 78 which pass about roll 76 and a forward roll 79. The upper tapes 77 pass about a forward roll 80 and about a lower rearward roll 81 and an upper rearward roll 82 having chain and sprocket driving connection 83 to roll 68 of the receiving conveyor. Roll 63 is driven in counterclockwise direction as viewed in Figue 2, so that the upper run of tapes 60 travels forward, roll 76 being also driven in counterclockwise direction so that the upper run of the tapes 78 travels forward. Tapes 59 are driven by tapes 60, in their passage about rolls 61 and 69, causing the lower run of tapes 59 to travel upward and forward. Roll 82 is driven from roll 68, in clockwise direction, so that the lower run of tapes 77 travels forward with the upper run of tapes 78, the speed of travel of all of the tapes being the same, as will be understood. Throw out means 85 is disposed between the rollers 76 and 62 and normally is in position substantially to bridge the space between these two rollers and assure passage of cut sheets from the receiving conveyor 57 to the delivery conveyor 58. The downwardly and forwardly inclined runs of the tapes 60, extending between rolls 62 and 63, pass over a suction box 86 and under a wind box or manifold 87. The suction boxes 66 and 86 are respectively connected to a suitable source of suction and each is provided in its upper wall with appropriately disposed openings therethrough, and the wind box 87 is connected to a blower or other suitable source of supply of air under pressure and is provided through its bottom wall with appropriately disposed openings.

Under normal operating conditions, the cut sheets are held by suction within box 66 upon the tapes 60 passing over this box, and travel forwardly with tapes 60 so as to be gripped between the latter and the lower run of tapes 59. The sheets then pass over the throw out means 85 to delivery conveyor 58 and are transported thereby to the lay boy 33. Under certain conditions it is desirable to divert the cut sheets from the conveyor 57 to the throw out table 32, as will be explained more fully later. That is accomplished by proper adjustment of the throw out means 85 so as to cause the sheets to travel downward over the suction box 86, this suction box and the streams of air projected under pressure from the manifold 87 serving to hold the sheets on the tapes 60. In normal operation, however, the throw out means is disposed as in Figure 2 and the cut sheets are delivered to the lay boy 33, as above noted.

It will be noted that the carrier 31 is driven at variable speed and independently of the cutting means, so that by regulating the speed of drive of the carrier the spacing of the cut sheets passing therethrough may be controlled as required. It will be understood that the means shown for driving the carrier is by way of example only, though preferred, and that any other suitable drive means for the carrier may be employed within the broader concept of my invention. It will also be understood that any suitable means for slitting the web of paper board and cutting it into sheets of desired dimension, other than the means shown by way of example, may be employed, within the broader concept of my invention. Suffice it to state that I provide suitable means whereby the web of paper board may be cut into sheets of desired dimension, in conjunction with means for receiving the cut sheets and transporting and delivering them to a suitable point of discharge or delivery.

The throw out means 85 comprises a tubular base member 90, extending transversely of carrier frame 91 and slidable in saddles 92 welded or otherwise suitably secured to the sides of frame 91 and extending thereabove. A tubular support 93 is secured to carrier frame 91 at each side thereof and extends outward therefrom in underlying parallel relation to base member 90. Two parallel upwardly projecting flanges 94 and 95 are secured, conveniently by welding, to the top area of each support 93. The flanges 94 and 95 receive between them a relatively short flange 96 welded to and depending from base member 90, restraining the latter against turning movement while permitting free sliding thereof in the saddles 92. It will be understood that the supports 93 and the flanges carried thereby are located outwardly beyond the roller and tape area of the carrier, and that the flanges 96 of base member 90 are likewise outside of such area in all adjusted positions of the base member 90 and the parts carried thereby.

Two pairs of mounting lugs 99 are welded or otherwise suitably secured to base member 90 and each pair of lugs rockably support a tubular shaft 99, restrained against endwise movement in a suitable known manner. Each shaft 99 has suitably secured thereto, conveniently by welding, a throw out bar or blade 100 of hollow construction. The blade 100 projects rearwardly from shaft 99 and is provided with a flat or planar upper face 101 and a concaved lower face 102, as shown more clearly in Figures 7 and 9. Two flat plates 103 are welded to the top of base member 90 and extend forwardly therefrom in overlying relation to roll 76, each of the plates 103 being aligned with one of the blades 100, as shown more clearly in Figure 5. The rearward portion of plate 103 extends into the associated blade 100 through a slot 104 therein of proper extent to accommodate movement of blade 100 with its shaft 99, as shown in Figure 7.

There are two blades 100, as will be clear from the above, and each of these blades corresponds in length to the width of the tape area of the carrier 85. Either blade may be used alone, though it is preferred to use both blades 100 when the sheets are of less width than the width of the trimmed paper board web, that is, when the web is slit lengthwise into two or more strips. In order that the blades may be positioned properly with respect to the carrier, means is provided for adjusting the base member 90 lengthwise, that is, transversely of the carrier. To that end a vertical shaft 106 is rotatably mounted at its lower portion in a bearing member 107 secured, conveniently by welding, to the carrier frame 91. This shaft is disposed at the inner end of one of the supports 93 and has secured thereon a sprocket wheel 108 about which passes a chain 109, this chain also passing about a sprocket wheel 110 rotatably mounted on a stub shaft 111 welded to a suporting bracket 112 which is, in turn, welded to support 93. The chain 109 is provided with an elongated link 113 in the form of an angle bracket, this link being fixed to flange 96 in any suitable manner, as by welding or riveting. A crank 115 is secured upon the upper end of shaft 106, the latter passing through a cat walk 116 (Figure 6) conveniently disposed at one side of the carrier frame 91. In Figure 5, the throw out means 85 is so adjusted that the blade 100 at the right normally underlies the sheets 35ᶜ passing to the delivery conveyor 58, and the blade 100 at the left normally underlies the sheets 35ᵈ passing to the conveyor 58.

Suitable means is provided for rocking the shafts 99 independently of each other and thereby selectively moving the blades 100 from their normal lower positions, shown in full lines in Figure 9, to their upper operative or throw out positions indicated in dotted lines. With blade 100 in its normal lowered position, the sheets pass from conveyor 57 over blade 100 and plate 103 to the conveyor 58, where they are gripped between the upper run of the tapes 78 and the lower run of the tapes 77 so as to be transported thereby to the lay boy. When the blade 100 is in its raised or operative position, the sheets leaving the conveyor 57 contact the lower concave surface 102 of blade 100 and are diverted thereby downward onto the forward inclined portions of tapes 60, being held thereon by the suction within the suction box 86 and the streams of air ejected from the wind box or conduit 87. Sheets thus diverted from the carrier are delivered to the throw out table 32, as will be explained more fully later.

A bar 118 is welded in each end of base member 90 and has welded thereto a base plate 120. Plate 20 has mounted thereon a tank 121 which receives air under appropriate pressure from a suitable air source, through a conduit 122. An outlet tube 123 (Figure 9) extends through base plate 120 and upward within tank 121 to within a short distance of the top thereof. This tube is connected by a pipe 124 to suitable known solenoid valve means, enclosed within a housing 125 mounted upon base plate 120, this valve means having an exhaust nipple 126 extending through the base plate 120. The valve means within housing 125 is connected by suitable lengths of flexible hose 127 and 128, and associated fittings, to the upper and lower ends, respectively, of a cylinder 130 pivoted at its upper end, at 131, to a lug 132 secured to tank 121. At its lower end the cylinder 130 is provided with a stuffing box 134 through which operates a piston rod 135 secured to a piston (not shown) operating in cylinder 130. The tank 121 serves as a surge tank for supplying compressed air to cylinder 130 while avoiding objectionable variations in pressure or surges in the compressed air line. When the throw out blade 100 is in its lowered position, upon actuation of the valve mechanism air under pressure is admitted to cylinder 130 beneath the piston and air is exhausted from cylinder 130 from above the piston, thus moving the piston rod 135 upward, and the reverse operation occurs upon actuation of the valve mechanism when the throw out blade 100 is in its raised or operative position. The piston rod 135 passes through a block 136 pivoted at 137 in a bifurcated arm 138 welded or otherwise suitably secured to shaft 99. Nuts threaded upon rod 135 above and below the block 136 restrain rod 135 against movement in either direction through the block, while providing convenient means for adjusting the effective length of the piston rod. It will be seen that by admitting air to cylinder 130, the throw out blade 100 may be raised or lowered as desired. It will also be seen that the throw out blades are operable independently of each other so that sheets may be thrown out from either side of the carrier, as desired or required. Since the base member 90 and the parts carried thereby are adjusted transversely of the carrier, the air supply conduits 122 connected to the respective tanks 121 are in the form of flexible hose lengths to accommodate movement of the tanks with the base member 90.

If the throw out blade 100 were moved from one position to another while a sheet was travelling across this blade, either above or below it, jamming of the carrier would result causing wastage of sheets and in some cases necessitating breaking of the web until the carrier had been cleared. That is objectionable for obvious reasons and, in order to avoid that difficulty, I provide means assuring that the throw out blade will operate only in the space between two adjacent sheets and at a time when there is no sheet passing across the throw out blade, either above or below it. In Figure 22 I have shown a diagram of the throw out control. A suitable light source 140, such as an electric lamp, is supported above the throw out blades adjacent each side of the carrier, by a bracket 141 (Figure 10) secured to a cross bar 142 extending transversely of the carrier frame 91 between the upper and lower runs of tapes 77 of the delivery carrier 58. Each of the lamps 140 projects a light beam l downward and rearward between adjacent tapes 60 of the receiving conveyor 57. The light beam l strikes a mirror 143 and is reflected thereby into a photoelectric cell of a photoelectric relay unit 144 suitably supported beneath a catwalk (not shown), extending transversely of the carrier adjacent the throw out, and spaced rearward of the throw out means. The lamp or the light source 140 may be of any suitable type, but preferably is one known commercially as a Worner No. 801L, and the unit 144 also is of known type, preferably a Worner No. 801R. A red light bulb 145 is mounted on a suitable support on the transverse catwalk, a short distance in rear of the throw out means and positioned at such a height as to be readily visible from both in front and in back of the carrier. A switch 147 of known type, as indicated, is mounted on the sheet catcher's platform 34, a second switch 148 also of known type, as indicated, is mounted under the catwalk 116 adjacent a throw out table 32, two switches 149 and 150, of known type as indicated, are mounted on a suitably located control panel, conveniently disposed adjacent the throw out means, and a switch 152, also of known type as indicated, is mounted on the frame between the slitting and cutting unit 30 and the receiving conveyor 31. A relay 153 of known type as indicated, is also mounted on the control panel, this relay preferably being a Struthers-Dunn 5HXX mechanically held relay.

The switch 149 is the main control switch for the throw out control means, and is shown in its closed condition. Suitable connections are provided for the various switches and associated apparatuses, such that by operation of any of the switches 147, 148, 150 and 152 operation of the throw out means will occur in proper timed relation to the passage of the cut sheets through the carrier. The switches and the relay 153 are shown in normal condition when the throw out blade 100 is in its lowered or normal position. If the switch 147 be depressed, nothing further occurs until a light ray from the light source 140 falls upon the mirror 143 and enters the unit 144. When that occurs, the lower coil of the relay 153 is energized, bridging the contacts of the relay and thus closing the circuit of light 145 and also closing the circuit of the valve operating means within the housing 125. That admits compressed air from tank 121 to the lower end of cylinder 130, while also exhausting air from the upper end of this cylinder, thereby raising the throw out blade 100 to its operative or throwout position, as above described. The light source 140, mirror 143 and unit 144 are so disposed as to assure operation of the throw out blade only at such times as a sheet is not passing across the blade, either above or below the latter, that is, only between the ends of adjacent sheets. That guards against jamming, as previously explained. The relay 153 is so designed that when the lower coil thereof is energized the circuit is balanced and the relay is locked closed. Upon release of the switch 147 for movement of the upper arm thereof into position to bridge the upper contacts, nothing further occurs until the light beam from the light source 140 again passes between two adjacent sheets, at which time the unit 144 is energized and the upper coil of the relay 153 is energized so that the bridging contact member thereof is returned to open position. That causes the valve operating means within the housing 125 to be deenergized, thus admitting air from tank 121 to the upper end of cylinder 130 and exhausting air from the lower end of the cylinder, thereby returning the throw out blade 100 to its lowered or inoperative position. The throw out blade is thus power operated so as to be removed substantially instantaneously from one position to the other, such movement being cushioned by the air in the cylinder 130 to avoid objectionable shocks. This quick operation of the throw out blade is advantageous in assuring that completion of the movement thereof in either direction will be attained before a sheet reaches the blade, of importance in avoiding jamming. In like manner, the throw out means may be operated from any one of the other switches 148, 150 and 152. It is the practice to throw out sample sheets at regular time intervals for test purposes. By briefly closing the switch 148, the tester may throw out sample sheets, which are then removed from the throw out table 32 and tested. Switch 152 is of advantage in enabling an operator at the slitting and cutting unit to throw out sheets when starting a run, until accurate adjustment of the slitting and cutting means has been attained, after which the switch 152 is released and returned to its normal condition permitting the sheets to be transported to the lay boy instead of being diverted to the throw out table.

The throw out table is shown more in detail in Figures 10 to 12, inclusive. It comprises a suitable frame 155 mounted upon flanged wheels 156 travelling upon rails 157 of a track extending transversely of the carrier and projecting beyond the sides thereof. That provides for adjusting the throw out table relative to the carrier so as to bring either area of the table into sheet receiving position. The table frame 155 supports a downwardly and forwardly inclined table top 158 the upper edge of which is disposed in proximity to roll 63. Top 158 is provided with a tube 160 extending lengthwise of its upper edge, this tube being adapted for engagement by hook elements 161 of dividers 162. Each of the dividers comprises a partition element 163 and base flanges 164 at the lower edge of element 163, extending from the sides thereof and disposed to seat upon the upper face of top 158. The table top 158 comprises two sheet receiving areas, separated by a block or platform 165 therebetween, each area being of proper length to extend the full width of the carrier overlying the table. It will be clear that the dividers 162 may readily be adjusted lengthwise of the table top 158 so as to provide therewith, at each area thereof, a plurality of sheet receiving compartments of proper widths for reception of sheets of various widths diverted from the carrier to the throw out table.

Referring more particularly to Figures 11 and 12, top 158 of the throw out table is provided, in each sheet receiving area thereof, with a plurality of upwardly opening transversely extending grooves 168, and with spaced openings 169 extending through the bottom of the grooves. The grooves 168 are of proper size to receive the arms of sheet stop members, of which I preferably provide short members and long members. Each of the short members comprises an arm 170 corresponding in width and thickness to the width and depth of groove 168, which arm 170 is provided at its upper end with a downwardly projecting angle finger 171 adapted for insertion through one of the openings 169, selectively. A brace member 172 extends upward from arm 170, at the lower end thereof, and is welded at its upper end to a stop plate 173 welded at its lower edge to arm 170, this plate being of a width substantially greater than that of arm 170. The long stop members are similar in construction to the short stop members, each comprising two arms 175 each adapted to fit into a groove 168 and provided at its upper end with an angle finger 176 insertible through any one of the openings 169, selectively. A brace member 177, at the lower end of each arm 175, supports a stop plate 178 welded at its lower edge to the arms 175 and to a sheet supporting plate 179 seating on the upper faces of the two arms 175 and welded thereto. As will be clear from Figure 11, the arms 175 of each of the long stop members are spaced apart a distance equal to that between three of the grooves 168, which are uniformly spaced. It is intended that the short stop members be used within the outline of the table top 158, as shown in Figure 11, whereas the long stop members are intended for use with sheets of a length to extend beyond the lower edge of table top 158, for which reason the plates 178, 179 of the latter stop members are of much greater width than the plates 173 of the short stop members. From what has been said, it will be clear that either area of the throw out table may be set up for sheets of any desired widths or lengths, within limits, but the use of the dividers 162 and the short and the long stop members. Suitable scales are provided adjacent the grooves 168, the scale at the right hand side of a groove being used for a short stop and the scale at the left hand side of the groove being used for a long stop, these scales indicating the length in inches of a sheet extending from the upper edge of the table top 158 to the stop plate of the stop member. One side or area of the throw out table may be used for sheets of sizes cut in accordance with one order, being then disposed in underlying relation to the throw out means, and prior to the completion of that order the other side of the table, then not in use, may be set up for the next succeeding order so that, upon completion of the first order, by shifting the throw out table transversely of the carrier to proper extent the side thereof set up for the succeeding order may be brought into proper relation to the carrier means and the throw out thereof. The throw out table 32, as disclosed herein, is shifted from one operative position to the other manually, but power means may be provided for that purpose if desired.

Referring to Figures 2 and 10, the carrier 31 is disposed for a portion of its length in overlying relation to the throw out table 32, providing an alley way accommodating shifting of the throw out table and passage of persons beneath the carrier. A cross bar 185 (Figure 10) is suitably secured, conveniently by welding, to carrier frame 91 adjacent the lower end of wind box 87. This cross bar slidably receives a plurality of sleeves, one of which is shown at 186, to each of which is secured a tubular guide rod 187. This rod 187 is telescoped at its lower end by an extension member 188 adjustably secured in position by a set screw 189 spaced a short distance above the lower end of rod 187. A counterweight 190 is attached to rod 187 by a cable 191 passing over suitably located cross bars 192 and 193 secured to frame 91. Preferably, a third cross bar 194 is secured to frame 91 and underlies the substantially horizontal run of cable 191 in advance of bar 192. A plurality of guide rods 187 is mounted on the cross bar 185 for adjustment about the latter as well as lengthwise thereof, there being a sufficient number of guide rods 187 to provide one thereof for each compartment of the area of the throw out table in use when the maximum number of compartments—three in the illustrated embodiment of my invention—is used. Each of the guide rods 187 used is positioned substantially centrally of the corresponding compartment of the throw out table and is in its lowered position shown in Figure 10.

A cross member 196 is disposed adjacent the lower end of suction box 86 and is provided with spaced sockets which receive the shanks of lift fingers, one of which is shown at 197. Two fingers 197 are provided for each compartment of the throw out table, these fingers being so disposed as to extend forwardly over the roll 63 and above the tapes 60 travelling thereabout, and being located adjacent the sides of the corresponding throw out table compartment. When a sheet is thrown out, it travels downward over the suction box 86, in the manner previously described, and as it passes over the fingers 197 the sides of the sheet are lifted or raised upward by the fingers. The guide rod 187 effectively restrains the central portion of a sheet entering the compartment of the throw out table against upward movement, so that the fingers 197 and rod 187 together assured that the sheet is bowed lengthwise, that is in the direction of its travel, as it is delivered to the compartment of the throw out table. That is of importance in that it avoids possibility of transverse bending of the sheet such as would, if permitted, cause wastage and prevent proper stacking of the sheets on the throw out table. The guide rod 187 also serves to prevent flying of the sheet entering the compartment of the throw out table, that is, sailing of the sheet in the air due to its speed of travel at the time that it passes out of the area of the suction box 86 and the wind box 87. By bowing the sheet lengthwise and restraining it against flying, in the manner explained, I assure that the sheets are stacked accurately within the compartments of the throw out table, which is conducive to high speed operation and the elimination of wastage. The lift fingers and the mounting thereof will be described more fully in connection with the delivery end of the carrier.

The carrier delivers the sheets to the lay boy 33, which will be described more fully later, which carries skids on which the cut sheets are stacked. Referring to Figures 14 and 15, it will be noted that roll 79 is disposed an appreciable distance in front of roll 80 and a cross bar 200 extends transversely of the carrier frame 91 adjacent and in back of roll 79. A strip 201 is secured to and spaced from cross bar 200, at the front thereof, by spacing plate 202 which are spaced apart at their ends providing spaced openings or sockets 203. The sockets 203 are adapted for reception of shanks 204 of lift fingers 205 extending forwardly over roll 79 and above the tapes 78. Downward movement of finger 205 is limited by a stop 206 welded or otherwise suitably secured thereto, it being understood that the width of shank 204 corresponds to the width of the socket 203 so that the shank fits snugly in the socket and the finger is restrained against looseness or play therein. The lift fingers adjacent the throw out table, previously referred to, are similar to and are mounted in the same manner as the lift finger 205. In practice, a lift finger 205 is so disposed as to underlie the cut sheet passing thereover, adjacent each side of the sheet.

A cross shaft 208 is rotatably mounted on the carrier frame 91 above the tapes 78 and between the rolls 79 and 80. This shaft is provided with a lengthwise keyway 209 which slidably receives a key 210 secured in a V-pulley 211 slidably mounted on shaft 208, which is driven from roll 80 by chain and sprocket drive means 212 (Figure 1). The pulley 211 receives a frame of an ejector 213 pivoted thereon, this ejector comprising a bifurcated head 214 straddling the pulley 211 and pivoted on the hub thereof, a rod 215 fixed in head 214 and extending forwardly therefrom, a fork 216 fixed on the forward end of rod 215 and enclosed in a housing 217 carried by fork 216, a V-pulley 218 carried by fork 216 within the housing 217, and a V-belt 219 passing about the pulleys 211 and 218. It will be seen that the ejector 213 is mounted on shaft 208 for adjustment lengthwise thereof and for movement thereabout while also being driven by this shaft. When the ejector 213 is in its lowered or operative position, shown in full lines in Figure 14, the lower run of belt 219 bears upon cut sheets passing over the roll 79, and as shown in Figure 14, the ejector is so positioned that the belt 219 bears upon the central area of the sheet. In practice I provide a plurality of ejectors equal in number to the maximum number of stacks— in the illustrated embodiment of my invention three—of cut sheets which are stacked on the lay boy. The ejector serves to eject cut sheets from the carrier and deliver them to be stacked on the lay boy, it being noted that as the cut sheet passes over the roll 79 the side portions thereof are lifted by the fingers 205 and the central area of the sheet is restrained against upward movement by the belt 219. In that manner the cut sheets delivered to the lay boy are bowed lengthwise, eliminating possibility of transverse bowing or bending of the sheets, and are restrained against flying by the ejector 213, assuring accurate delivery of the cut sheets to the lay boy in substantially the same manner as accurate delivery of the cut sheets to the throw out table is assured upon operation of the throw out means.

It is desirable that means be provided to move the ejectors 213 into positions clear of the lay boy and parts carried thereby when shifting the lay boy from one position to another, as above mentioned. To that end, a cross bar 221 is rockably mounted in carrier frame 91 above the ejectors, and has secured thereto a radially projecting flange 222. Each of the ejectors has an arcuate link 223 pivoted thereto at its lower end, at 224, this link having secured to its upper end a hook 225 shaped to engage over flange 222 and about the cross bar 221, this hook conveniently having a set screw 226 threaded therethrough for adjusting the hook relative to the cross bar and the flange thereof. An arm 227 is fixed at its upper end to cross bar 221 and is pivoted at its lower end, at 228, to one end of a piston rod 229 operating through a stuffing box 230 (Figure 16) at one end of a cylinder 231 pivoted at 232 on a bracket 233 mounted on frame 91. Suitable valve mechanism is provided for admitting and exhausting air under pressure to and from the cylinder 231 at the ends thereof, through flexible conduits 234 and 235. These conduits extend to suitable valve mechanism enclosed within a housing 236 mounted on bracket 233, this housing also enclosing electroresponsive valve actuating and control means, the arrangement being similar to that for operating the throw out bars, except that no circuit for timing the operation of the cross bar 221 is provided. Any other suitable means may be provided for operating cross bar 221, within the broad concept of my invention. It will be clear that when the piston rod 229 is moved from its full line position of Figure 14 to its dotted line position of that figure, the cross bar 221 is rocked in clockwise direction thus raising the ejectors 213 from the full line position into the dotted line position thereof, clear of the lay boy and the parts carried thereby. Upon reverse movement of the piston rod 229, the cross bar 220 is returned to its original position, returning the ejectors to their lowered or operative position. It will also be noted that each of the links 223 is provided with a rearwardly projecting lug or spur 238 adapted for engagement over the flange 222.

When any one of the ejectors 213 is not in use, it is held in raised position by moving it upward until the spur 238 engages in back of flange 222, at which time link 223 is in the position indicated in dot and dash lines effective for holding the ejector in the dot and dash line positions indicated, where it is clear of the cut sheets passing to the lay boy. In that manner, any ejector, selectively, may be readily moved to and retained in raised position when not desired for use.

Referring to Figures 16 to 20, inclusive, the lay boy 33 comprises a wheel mounted frame 240 of suitable construction travelling upon rails 241 of a track extending across the delivery end of the carrier. Two platforms or tables 242 are mounted in frame 240 for vertical adjustment, as will be explained more fully presently, each of these tables being of a width to extend completely across the delivery end of the carrier and being adapted for reception of skids 243 upon which the cut sheets are stacked. The tables 242 are disposed at opposite sides of a mid-frame 245 (Figures 1 and 18) included in the general structure of frame 240. An angle member 246 is secured to frame 240, at the top thereof and at each side of the mid-frame 245, each of these angle members extending the full length of the corresponding table 242, these tables being rectangular in plan, as shown in Figure 1. The vertically extending flange of angle member 246 is engaged, at its upper edge, by hook members 247 of dividers 248 having at their rearward ends and at each side thereof a flange 249 which seats against the inner or forward face of member 246, as in Figure 14. The number of dividers used for each table will depend upon the number of stacks of sheets and if three stacks of sheets are to be formed, as illustrated, four dividers will be used for each table. In Figure 16 the left hand table 242 is shown in partially lowered position, for clearness of illustration. In practice, the respective tables are raised to their uppermost position, prior to shifting of the lay boy so as to bring the table into sheet receiving position, and when the table is raised into its uppermost position the tops of the skids 243, omitted from the left hand table for clearness of illustration, are brought into position between the dividers 248, which then form with the skids compartments for reception of the sheets to be stacked. It will be clear that the dividers may be adjusted along the member 246 to provide compartments of proper width to accommodate the cut sheets and that the number of compartments may be varied by varying the number of dividers used. In Figure 16 the table 242 at the right is at about the limit of its downward movement, with the cut sheets in stacks s upon the skids 243.

Each of the tables 242 has a guide block 252 secured to each corner thereof, this guide block fitting about a vertical guide post 253 suitably secured in frame 240. A transverse shaft 254 is rotatably mounted on frame 240 at each end thereof and at each side of the mid-frame 245, that is, above the inner end of each table. Each of the shafts 254 have secured thereon grooved pulley wheels 255 over which pass chains 256 anchored at one end, at 257, to the corner blocks 252. The chains 256 are suitably secured to and windable onto and off of helically grooved winding drums 258 secured upon a shaft 259 rotatably mounted on frame 240 adjacent the bottom thereof. A shaft 260 (Figures 17 and 19) is rotatably mounted on frame 240 at the back of each table area thereof and extends to the center of the mid-frame 245. A worm 261 is secured upon each end portion of each shaft 260, the worms of each of these shafts meshing with worm gears 262 keyed upon the rearward ends of the winding shafts 259 of the corresponding table. Each of the shafts 260 has a pulley 263 secured upon its outer end, this pulley receiving a belt 264 passing about a pulley 265 on the shaft of an electric motor 266 mounted upon a platform 267 pivoted at 268, adjacent its forward end, on frame 240 for rocking movement about a horizontal axis. Platform 267 carries an outwardly projecting arm 270 disposed to actuate a switch 271, of known type, mounted on an upright 272 secured to the base of frame 240, arm 270 also serving, in cooperation with upright 272, to limit movement of the platform 267 and the motor 266 under the weight of the latter. An operating arm 275 is secured to and extends forwardly and upwardly from platform 267, this arm being accessible for adjusting the lay boy table, under certain conditions, as will be described later. The upper run of belt 264 passes beneath a dished or bowed plate 276 secured to and projecting outward from an element of the frame 240. The motor 266 is controlled by switch 271 and an upper switch 277 mounted upon frame 240 adjacent the top thereof, through a control box 278 mounted on the end of frame 240. The table 242 is provided at its outer end, with a projection 280 disposed to contact arm 281 of switch 277, as the table approaches its uppermost position. That serves to open the switch 277, opening the circuit of motor 266 and thus limiting the upward travel of table 242. That operation will be explained more fully later, it sufficing for present purposes to note that suitable means is provided to open the circuit of motor 266 when table 242 has reached the proper limit of its upward travel.

When a table reaches the limit of its downward travel, the lay boy is shifted so as to bring the empty table, with the skids thereon, in sheet receiving position, moving the loaded table clear of the carrier and the sheet catcher's platform 34. The skids, with the stacks of sheets thereon, are then removed by a lift truck, after which empty skids are placed upon the table and this table is returned to its raised position so as to be ready for use when the lay boy is again shifted. Raising of the empty table is accomplished by swinging the lever 275 downward and forward, thus raising the platform 267 and with it the motor 266. That serves to tighten the belt 264 while also permitting closing of the switch 271, the motor 266 being then driven and serving to drive the shaft 260. The driving of shaft 260 from the motor 266 serves to drive the winding shaft 259 in winding direction, thus winding the chains 256 onto the drums 258, which serves to return the table 242 to its uppermost or raised position. In practice, the winding drums and the driving connection between the motor 266 and the pulley 263 are covered by suitable guards, as shown in Figure 16. From the latter figure it will be noted that in the position of the lay boy there shown the lever 275 at the end of the lay boy adjacent the catcher's platform is readily accessible from the latter so that the table may be raised slightly, if required.

During stacking of the sheets on the skids, the table in use is lowered as required in accordance with the increase in height of the stacks. That is accomplished under control of an operator on the sheet catcher's platform 34, as will be explained more fully later. Referring to Figures 19 and 20, it will be noted that the shafts 260 are coaxial and have ratchet wheels 282 secured upon their inner ends. A yoke 283 straddles the ratchet wheels 282 and is rockably mounted, at its rearward end, on the shafts 260 between the respective worms 261 and ratchet wheels 282. This yoke is provided with a forward extending arm 284 pivoted at 285 to the lower end of a link 286 pivoted at its upper end, at 287, to a crank 288 of a speed reducing unit 289, of suitable known type, driven by an electric motor 290, this motor and unit 289 being mounted on a platform 291 of the midframe 245. It will be seen that when the motor 290 is in operation, the yoke 283 reciprocates about the common axis of the shafts 260.

Two pawls 293 (Figure 20) are pivotally mounted in spaced relation, with the ends of their hubs in contact, upon a rod 294 mounted in the arms of yoke 283, spacers 295 disposed about rod 294 restraining the pawls against movement away from each other. These pawls 293 are disposed for engagement with the respective ratchet wheels 282, as shown, the teeth of each ratchet wheel and the tooth of the cooperating pawl being so related that on the upstroke of a pawl, when in operative position, the ratchet wheel is turned in counterclockwise direction as viewed in Figure 18, and upon the down stroke of the pawl the ratchet wheel is not turned. Each pawl has pivoted thereto a stirrup 296 secured upon the lower end of a rod 297 which passes loosely through the upper end of an arm 298 fixed to a sleeve 300a loose on a stub shaft 299 in a bearing structure 300 carried by a bracket 301 suitably secured on the mid-frame 245. Arm 298 is raised by a tension spring 302 anchored thereto and to a platform 303 of the mid-frame 245. In its raised position, arm 298 contacts an abutment 304 secured upon the upper end of rod 297, thereby holding this rod in raised position effective for maintaining the corresponding pawl 293 in raised or in operative position. It will be understood that there are two sleeves 300a loose on stub shaft 299 and that an arm 298 is secured at its lower end to each of these sleeves. A second arm 305 is also secured at one end to each of the sleeves 300a and extends therefrom oppositely to arm 298. The outer end of each arm 305 is connected by a link 306 to head 307 of a movable core or plunger 308 of a solenoid 309 mounted on and depending from the platform 303.

A compression spring 297a, mounted about the upper portion of each rod 297, is confined between the lower face of arm 298 and a collar 297b fixed on rod 297. When the solenoid 309 is energized, the arm 298 is moved downward, first permitting movement of the corresponding pawl, by gravity, into its lowered or operative position, in which it is disposed in cooperating relation to the corresponding ratchet wheel 282, and thereafter placing spring 297a under compression effective for yieldingly urging the pawl toward its cooperating ratchet wheel. If the motor 290 is in operation, the pawl 293 which is in operative position turns the corresponding ratchet wheel 282, and with it the shaft 260, step by step in the opposite direction so that in which this shaft 260 is rotated by the table raising motor 266. This reverse rotation of shaft 260 causes lowering of the corresponding table 242, the table being lowered under control of an operator on the sheet catcher's platform, as will be explained more fully later. Upon deenergization of the solenoid 309, the corresponding arm 298 is returned to its raised position by the tension spring 302, thus returning the corresponding pawl 293 to its raised or inoperative position and halting the downward movement of the table.

The lay boy is wheel mounted to travel on rails 241 of a track extending across the delivery end of the carrier, as above noted. To that end axles 312 are rotably mounted on frame 240 adjacent each end thereof and at the center of the mid-frame 245. Each of these axles has secured thereon two flanged wheels 313 which travel upon the rails 241. The axles 312 at the center of mid-frame 245 has secured thereon a worm gear 314 which meshes with a worm 315 secured on a shaft 316 rotatably mounted on mid-frame 245. A V-pulley 317 is secured on shaft 316 and is driven by a belt 318 passing thereabout, this belt passing about a V-pulley 319 secured on the shaft of a motor 320 mounted on a base 321 adjustably supported from the platform 303. Operation of the motor 320 is controlled from the sheet catcher's platform, as will be explained more fully later, for propelling the lay boy 33 along the rails 241 and thereby bringing either table 242, selectively, into sheet receiving position.

In order to accommodate sheets of greater length than the width of the table 242, adjustable means is provided for increasing the effective width of the respective tables. To that end each table has secured thereunder a plurality of transverse tubes 323, one of which is shown in section in Figure 18, which slidably receive tubular rods 324 secured to the under face of an extension plate 325 the upper face of which, in the use of the extension member, is disposed in the plane of the upper face of the table. Preferably, each table is provided with two extension members, each of a length equal to one half that of the table. By the use of the extension members 326, the effective width of either half of the table may be adjusted for reception of a relatively long skid 327 (Figure 1) for stacking thereon sheets of much greater length than the width of table 242. In order to accommodate sheets of lengths materially greater than the width of the table 242, the sheet catcher's platform 34 is wheel mounted to travel on rails 328 (Figure 16) of a track extending from the lay boy track and aligned with the carrier. The sheet catcher's platform 34 comprises a suitable frame 329 supporting the platform proper 330, and a downwardly and forwardly inclined apron 332 extending from the platform 330. A vertical shaft 333 is rotatably mounted on frame 329 and extends upward through an opening 334 in apron 332, there being a disk or wheel 335 secured on the upper end of shaft 333 and provided with a handle 336 for rotating shaft 333 in desired direction. A sprocket wheel 337 is secured upon the lower end of shaft 333 and receives a sprocket chain 338 passing thereabout, this chain also passing about two sprocket wheels 339 rotatably mounted on frame 329 and disposed in triangular arrangement with the sprocket wheel 337. The run of the chain extending between the two sprocket wheels 339 is fixed to a post 340 suitably anchored in the floor or foundation 341 supporting the rails 328 and associated parts. It will be seen that by rotating shaft 333 in proper direction, the sheet catcher's platform 34 may be adjusted toward and away from the lay boy, as required.

Platform 330 of the sheet catcher's platform 34 is provided with a suitably disposed lengthwise reenforcing strip 345 (Figure 1), which is relatively thick and is provided with a series of openings or sockets 346 adapted for reception of shouldered posts 348 at the lower ends of articulated arms 349 on the upper ends of which are pivotally mounted chairs 350 for the sheet catchers. Due to the provision of the articulated arm support 349, the chairs 350 may be adjusted toward or away from the stack s of sheets to suit the individual sheet catcher. The sheet catchers catch the sheets as they are delivered from the ejectors to the stacks and even up the front edges of the sheets, it also being the duty of the sheet catchers to inspect the sheets as they are delivered to the stack and to discard defective sheets, which are placed upon the inclined apron 332 down which they slide and from which they are recovered and stacked by hand upon skids adjacent the catcher's platform. These defective sheets are later cut into sheets of smaller size to remove the defects and reduce waste.

The platform 330 is further provided, at the rearward portion thereof, with a treadle 352 spaced from the reenforcing strip 345, and with two treadles 353, adjacent strip 345. The treadles are all normally held in raised position and the treadle 352 controls the solenoids 309, in a manner which will be explained later, for controlling lowering of the table 242 in the manner above described. The treadles 353 each control a throw out switch 147 (Figure 22) whereby an operator on the sheet catcher's platform may throw out the sheets as desired or necessary.

In Figure 23 I have illustrated diagrammatically the various circuits and accessories for effecting and controlling adjustments of the lay boy and lay boy table. The motor 320 for propelling the lay boy is controlled primarily by a double push button switch 355, of known type as indicated, mounted upon the platform 34 in position accessible to an operator seated on one of the chairs 350. The circuit of motor 320 includes two limit switches 356, of known type as indicated, which cooperate with a track cam 357, suitably supported in back of and adjacent the lay boy, for limiting travel of the lay boy in either direction. The operator on the sheet catcher's platform adjusts the lay boy so as to bring the table thereof into its final position for receiving sheets discharged at the delivery end of the carrier. The limit switches and the motor 320 are appropriately connected through a control box 358 mounted at an appropriate position upon the lay boy. It will be understood, of course, that a suitable cable extends from the switch 355 on the sheet catcher's platform, this cable being of suitable length and flexible to permit of the required relative movement between the lay boy and the sheet catcher's platform. Raising of the lay boy tables is effected by the respective motors 266 controlled by the upper limit switch 277 and the lower switch 271, in the manner above described. The table lowering motor 290 is controlled, through a controller box 360 mounted in a suitable location on the lay boy, by a push button switch 361, of suitable known type as indicated, mounted on the control panel previously referred to. Current for energizing the solenoids 309 is derived from the main circuit through a transformer 362, which may be mounted on the carrier frame 91, suitably connected to the main feeder lines.

Limit switches 363, of known type as indicated, and a selector switch 364, also of known type as indicated, are connected in circuit with the solenoids 309 and with each other and are suitably mounted upon the lay boy. The selector switch 364 cooperates with a cam track 365, supported in fixed position in back of and adjacent the lay boy, for determining which of the solenoids 309 can be energized. Red electric light bulbs 366 are connected in circuit with the solenoids and with the limit switches 363, these lights being mounted on the carrier frame (Figure 16) in position to be readily visible from the sheet catcher's platform.

When the lay boy table upon which the cut sheets are being stacked reaches its lowermost position, the corresponding limit switch 363 is actuated by that table so as to open the circuit of the corresponding solenoid 309, thus preventing further downward movement of the table, and close the circuit of the corresponding light 366, thus notifying the operator on the sheet catcher's platform that the table has reached the limit of its down travel. The lay boy is then shifted by means of the motor 320 and the limit switches 356, and is adjusted so as to bring the raised empty table into sheet receiving position. In this shifting of the lay boy the selector switch 364 is actuated, either by contact with cam track 365 or by passing out of contact therewith, depending upon the direction of travel of the lay boy, so as to condition the circuit of the other solenoid for lowering the corresponding table. For example, if it be assumed that the right hand table (with reference to the sheet catchers) of the lay boy, as viewed in Figure 1, has reached the limit of its downward travel, the right hand limit switch 363 of Figure 22 is actuated to open the circuit of the right hand solenoid 309 and close the circuit of the corresponding lamp 366. In order to bring the left hand table of the lay boy into sheet receiving position, the lay boy is shifted to the right and adjusted into proper position, objectionable overtravel in that direction being guarded against by the left hand limit switch 356 and the cam track 357. Also, as the lay boy reaches the limit of its travel toward the right, selector switch 364 is actuated by cam track 365 so as to open the circuit of the right hand solenoid 309 and of the corresponding light 366, and close the circuit of the left hand solenoid 309. In referring to the opening and closing of the circuits of the solenoids 309 and the corresponding lights or lamps, I am referring, in each instance, to those portions of the respective circuits which extend to and include the selector switch 364, but do not extend beyond the latter. After the lay boy has been shifted in the manner described, lowering of the left hand table as required, in the stacking of the sheets thereon, may be controlled by switch 367, of suitable known type as indicated, mounted on the sheet catcher's platform and actuated by the treadle 352. When the table in use reaches the limit of its down travel, the left hand limit switch 363 is actuated to open the circuit of the left hand solenoid 309 and close the circuit of the corresponding lamp 366. During the use of the table at the left hand end of the lay boy, the skids on the lowered right hand table, with the stacks of sheets thereon, are removed therefrom by a lift truck, and after the left table has reached the limit of its down travel and the right table has been raised, the lay boy is shifted toward the left so as to again bring the right table into sheet receiving position, the circuit of the right hand solenoid 309 and the corresponding lamp 366 being then conditioned for closing as desired by actuation of the switch 367, in an obvious manner.

It will be understood that during the operation of shifting the lay boy from one position to the other, the slitting and cutting unit 30 and the carrier 31 continue in operation. In order to avoid wastage, the throw out means is operated so as to divert the cut sheets from the receiving conveyor 57 to the throw out table 32, during the shifting of the lay boy, it being understood that the area of the throw out table underlying the carrier is set up to provide sheet receiving compartments corresponding to the sheets being cut. Upon completion of the shifting of the lay boy, the throw out blades are lowered and the cut sheets are then delivered to the lay boy as before. The sheets thrown out on the table 32 may be stacked on skids positioned adjacent the throw out table.

It has been previously explained that the cut sheets may vary widely both as to width and length. In Figure 1 it has been assumed, for purposes of description, that an order for sheets of the sizes being cut has been substantially filled, so that the lay boy table then in use has sufficient remaining capacity to complete that order. In the meantime, the table at the upper or left side of the lay boy has been set up for sheets of a second order of different sizes than those of the first order. Upon completion of the first order, the throw out blades 100 are moved into operative position, the web 35 is broken, the other set of slitters is moved into opreative position, having previously been adjusted for the second order of sheets, and the lay boy is shifted so as to bring the left table thereof into sheet receiving position, the throw out blades remaining in operative or throw out position until the web has been retreaded through the slitting and cutting unit 30 and proper adjustments have been made to assure accurate cutting of the sheets of the second order. After the proper adjustments have been made, the throw out blades 100 are lowered and the cut sheets of the second order are then delivered to the lay boy table in the same manner as before. The sheets thrown out on the throw out table 32, during the change over to the second order, are stacked on skids adjacent the throw out table and, if required, may be trimmed accurately to desired sizes.

It will be noted that the lower or right hand sheets being delivered to the lay boy table in Figure 1 are longer than the sheets being delivered to the two left hand compartments of this table, so that the stacks of the latter sheets will fill up more rapidly than the stacks of the longer sheets. The operator on the sheet catcher's platform, by depressing pedal 353 may throw out the shorter sheets $35^c$, from time to time, in sufficient amount to maintain the stacks of the shorter sheets at substantially the same height as the stack of the longer sheets $35^d$. In that connection, it is to be noted that Figure 22 is a diagram of one throw out circuit only, there being two such circuits each controlled by a pedal 353 on the throw out platform 34. It will also be seen that by providing two throw out knives 100, sheets may be thrown out from either side of the carrier, enabling of the stacks being kept at substantially the same height, as described, while also avoiding necessity for throwing out sheets throughout the full width of the carrier, under conditions when it is desired to throw out sheets of one length only. Further, even when the sheets being cut are of the same dimensions, it may be desirable to throw out sheets at one side of the carrier only, which is rendered possible by the use of the two throw out blades as described. When shifting the lay boy while continuing to cut sheets of the same sizes or order, the throw out blades 100 are raised into operative position so as to divert the sheets to the throw out table until shifting of the lay boy has been completed, at which time the throw out blades are again lowered and the cut sheets are delivered to the table of the lay boy then in sheet receiving position. That avoids any delay during shifting of the lay boy and avoids wastage, which is conducive to increased speed in operation and increased production, an important consideration in this art.

It will be understood by those experienced in the production of paper board sheets, that changes in construction and arrangement of parts of my invention may be resorted to without departing from the field and scope thereof, and I intend to include all such variations, as fall within the scope of the appended claims, in this application in which the preferred form only of my invention has been disclosed.

I claim:

1. In apparatus of the character described, slitting and cutting means for receiving a web of paper and cutting it into sheets of variable width and length, carrier means for receiving the cut sheets and transporting them to a point of delivery, a throw out table underlying said carrier means extending the full width thereof, and throw out means for optionally diverting sheets from either side of said carrier means selectively to said throw out table.

2. In apparatus of the character described, slitting and cutting means comprising adjustable slitters and independently driven variable speed cut-off knives for receiving a web of paper and cutting it into sheets of variable width and length, variable speed independently driven carrier means for receiving the cut sheets and transporting them to a point of delivery, a throw out table underlying said carrier means extending the full width thereof and having compartments for reception of sheets diverted from said carrier means, and throw out means for optionally diverting sheets from either side of said carrier means selectively to said throw out table.

3. In apparatus of the character described, slitting and cutting means comprising adjustable slitters and independently driven variable speed cut off knives for receiving a web of paper and cutting it into sheets of variable width and length, a lay boy, variable speed independently driven carrier means for receiving the cut sheets and transporting and delivering them to said lay boy, the latter comprising two tables each of a length to receive the sheets delivered from said carrier means and being adjustable transversely of said carrier means to bring either of said tables selectively into sheet receiving position, a throw out table underlying said carrier means extending the full width thereof, and throw out means for optionally diverting sheets from either side of said carrier means selectively to said throw out table.

4. In apparatus of the character described, continuously driven slitting and cutting means for receiving a web of paper and cutting it into sheets of variable width and length, a lay boy, variable speed independently driven carrier means for receiving the sheets from said slitting and cutting means and transporting and delivering them to said lay boy, the latter comprising two tables each of a length to receive the sheets delivered from said carrier means and being adjustable transversely of said carrier means to bring either of said tables into sheet receiving position, a throw out table underlying said carrier means extending the full width thereof, throw out means for optionally diverting sheets from either side of said carrier means selectively to said throw out table, and a catcher's platform at the outer side of and adjustable toward and away from said lay boy.

5. In apparatus of the character described, continuously driven slitting and cutting means for receiving a web of paper and cutting it into sheets of variable length and width, a lay boy, variable speed independently driven carrier means for receiving the cut sheets and transporting and delivering them to said lay boy, the latter comprising two tables each of a length to receive the sheets delivered from said carrier means and being adjustable transversely of said carrier means to bring either of said tables selectively into sheet receiving position, a throw out table underlying said carrier means having two areas each of a length equal to the width of said carrier means, said table being adjustable transversely of said carrier means for positioning either of said areas thereof selectively beneath said carrier means, and throw out means for optionally diverting sheets from said carrier means to said throw out table.

6. In apparatus of the character described, continuously driven slitting and cutting means for receiving a web of paper and cutting it into sheets of variable length and width, a lay boy, variable speed independently driven carrier means for receiving the cut sheets and transporting and delivering them to said lay boy, a throw out table underlying said carrier means having two areas each of a length equal to the width of said carrier means, said table being adjustable transversely of said carrier means for positioning either of said areas thereof selectively beneath said carrier means, and throw out means for optionally diverting sheets from said carrier means to said throw out table.

7. In apparatus of the character described, slitting and cutting means comprising adjustable slitters and independently driven variable speed cut off knives for receiving a web of paper and cutting it into sheets of variable width and length, a lay boy, variable speed independently driven carrier means for receiving the cut sheets and transporting and delivering them to said lay boy, a throw out table underlying said carrier means, throw out means for optionally diverting sheets cut by either of said knives selectively from said carrier means to said throw out table, and a sheet catcher's platform at the outer side of and adjustable toward and away from said lay boy.

8. In apparatus of the character described, slitting and cutting means comprising adjustable slitters and independently driven variable speed cut off knives for receiving a web of paper and cutting it into sheets of variable width and length, a lay boy, variable speed independently driven carrier means for receiving the cut sheets and transporting and delivering them to said lay boy, and a sheet catcher's platform at the outer side of and adjustable toward and away from said lay boy.

9. In apparatus of the character described, slitting and cutting means comprising adjustable slitters and independently driven variable speed cut off knives for receiving a web of paper and cutting it into sheets of variable width and length, a lay boy comprising a vertically adjustable sheet receiving table, variable speed independently driven carrier means for receiving the cut sheets and transporting and delivering them to said table, a throw out table underlying said carrier means, throw out means for diverting sheets cut by either of said knives selectively from said carrier means to said throw out table, a sheet catcher's platform at the outer side of and adjustable toward and away from said lay boy, and means controlled by an operator on said platform for lowering said lay boy table.

10. In apparatus of the character described, slitting and cutting means comprising adjustable slitters and independently driven variable speed cut off knives for receiving a web of paper and cutting it into sheets of variable width and length, a lay boy comprising a vertically adjustable sheet receiving table, variable speed independently driven carrier means for receiving the cut sheets and transporting and delivering them to said table, a sheet catcher's platform at the outer side of and adjustable toward and away from said lay boy, and means controlled by an operator on said platform for lowering said lay boy table.

11. In apparatus of the character described, means for receiving a web of paper and cutting it into sheets, a lay boy comprising a vertically adjustable sheet receiving table, carrier means for receiving the cut sheets and transporting and delivering them to said table, a sheet catcher's platform at the outer side of said lay boy, and means controlled by an operator on said platform for lowering said lay boy table.

12. In apparatus of the character described, means for receiving a web of paper and cutting it into sheets, carrier means for receiving the cut sheets and transporting them to a point of delivery, a throw out table underlying said carrier means, throw out means for optionally diverting sheets from said carrier means to said table, and means controlled by sheets being transported by said carrier means whereby said throw out means is rendered operable in timed relation to the travel of the sheets.

13. In apparatus of the character described, means for receiving a web of paper and cutting it into sheets, carrier means for receiving the cut sheets and transporting them in endwise spaced apart relation to a point of delivery, a throw out table underlying said carrier means, throw out means extending transversely of said carrier means operable for optionally diverting sheets from said carrier means to said throw out table, and means controlled by the sheets being transported by said carrier means whereby operation of said throw out means is disabled during passage of the sheets thereacross and is enabled between the ends of adjacent sheets.

14. In apparatus of the character described, means for receiving a web of paper and cutting it into sheets, carrier means for receiving the cut sheets and transporting them in endwise spaced apart relation to a point of delivery, a throw out table underlying said carrier means, throw out means comprising a normally lowered throw out member extending transversely of said carrier means underlying the sheets and movable to raised position effective for diverting the sheets from said carrier means to said throw out table, means for operating said throw out member, and means controlled by the sheets being transported by said carrier means whereby said operating means is disabled during passage of sheets across said throw out member and enabled when said throw out member is between the ends of adjacent sheets.

15. In apparatus of the character described, means for receiving a web of paper and cutting it into sheets, carrier means for receiving the cut sheets and transporting them to a point of delivery comprising spaced apart conveyor tapes, a throw out table underlying said carrier means, throw out means comprising a normally lowered throw out member extending transversely of said carrier means underlying the sheets and movable to raised position effective for diverting the sheets from said carrier means to said throw out table, means for operating said throw out member, a light source disposed to direct a light beam between said tapes along a path intercepted by the sheets, and means for enabling and disabling said operating means responsive to passage of the light beam between said tapes and interception of the light beam by the sheets.

16. In apparatus of the character described, means for receiving a web of paper and cutting it into sheets, carrier means for receiving the cut sheets and transporting them to a point of delivery comprising spaced apart conveyor tapes, a throw out table underlying said carrier means, throw out means comprising a normally lowered throw out member extending transversely of said carrier means underlying the sheets and movable to raised position effective for diverting the sheets from said carrier means to said throw out table, pressure fluid power means for operating said throw out member, and means controlled by the sheets being transported by said carrier means whereby said operating means is disabled during passage of sheets across said throw out member and enabled when said throw out member is between the ends of adjacent sheets.

17. In apparatus of the character described, means for receiving a web of paper and cutting it into sheets, carrier means for receiving the cut sheets and transporting them to a point of delivery comprising spaced apart conveyor tapes, a throw out table underlying said carrier means, throw out means comprising a normally lowered throw out member extending transversely of said carrier means underlying the sheets and movable to raised position effective for diverting the sheets from said carrier means to said throw out table, pneumatic pressure power means for operating said throw out member, and means controlled by the sheets being transported by said carrier means whereby said operating means is disabled during passage of sheets across said throw out member and enabled when said throw out member is between the ends of adjacent sheets.

18. In apparatus of the character described, means for receiving a web of paper and cutting it into sheets, carrier means for receiving the cut sheets and transporting them to a point of delivery, a throw out table underlying said carrier means, and throw out means for optionally diverting sheets from different transverse areas selectively of said carrier means to said throw out table.

19. In apparatus of the character described, means for receiving a web of paper and cutting it into sheets, carrier means for receiving the cut sheets and transporting them to a point of delivery, a throw out table underlying said carrier means, and throw out means for optionally diverting sheets from either side of said carrier means selectively to said throw out table, said throw out means comprising two throw out members adjustable transversely of said carrier means each equal in length to the width of said carrier means.

20. In apparatus of the character described, means for receiving a web of paper and cutting it into sheets, carrier means for receiving the cut sheets and transporting them to a point of delivery, a frame adjustable transversely of said carrier means, and two independently operable throw out members mounted on said frame each of a length equal at least to the width of said carrier means.

21. In apparatus of the character described, means for receiving a web of paper and cutting it into sheets, carrier means for receiving the cut sheets and transporting them to a point of delivery, a throw out table underlying said carrier means, the latter comprising a receiving conveyor and a delivery conveyor spaced apart at their inner ends and each having upper and lower tapes, the lower tapes at the forward end of said receiving conveyor being inclined downward and forward to said throw out table, and throw out means extending transversely of said carrier means between said conveyors comprising throw out members normally in lowered position for passage of the sheets thereover to said delivery conveyor and movable to raised position effective for diverting the sheets to the downwardly and forwardly inclined forward end portions of the lower tapes of said receiving conveyor.

22. In apparatus of the character described, means for receiving a web of paper and cutting it into sheets, carrier means for receiving the cut sheets and transporting them to a point of delivery, a throw out table underlying said carrier means, the latter comprising a receiving conveyor and a delivery conveyor spaced apart at their inner ends and each having upper and lower tapes, the lower tapes at the forward end of said receiving conveyor being inclined downward and forward to said throw out table, throw out means between said conveyors for diverting the sheets to the downwardly and forwardly inclined forward end portions of the lower tapes of the receiving conveyor, and means for bowing transversely sheets passing from the lower tapes of said receiving conveyor to said throw out table.

23. In apparatus of the character described, means for receiving a web of paper and cutting it into sheets, carrier means for receiving the cut sheets and transporting them to a point of delivery, a throw out table underlying said carrier means, the latter comprising a receiving conveyor and a delivery conveyor spaced apart at their inner ends and each having upper and lower tapes, the lower tapes at the forward end of said receiving conveyor being inclined downward and forward to said throw out table, throw out means between said conveyors for diverting the sheets to the downwardly and forwardly inclined forward end portions of the lower tapes of the receiving conveyor, and means for lifting the sides of sheets passing to the throw out table while restraining the central areas of such sheets against upward movement whereby the sheets passing to the throw out table are bowed transversely.

24. In apparatus of the character described, means for receiving a web of paper and cutting it into sheets, carrier means for receiving the cut sheets and transporting them to a point of delivery, the latter comprising a receiving conveyor and a delivery conveyor spaced apart at their inner ends and each having upper and lower tapes, said receiving conveyor comprising two forward upper rolls and a forward lower roll about which the lower tapes thereof pass providing a substantially horizontal run extending forwardly beyond the upper tapes of said receiving conveyor and a downwardly and forwardly inclined run extending from said horizontal run, said lower roll being disposed above and adjacent said throw out table, lift fingers extending over said lower roll and above the tapes thereon positioned to lift the sides of sheets passing over said inclined run to said throw out table, and means for optionally diverting sheets from said receiving conveyor to said inclined run of the lower tapes thereof.

25. In apparatus of the character described, slitting and cutting means comprising adjustable slitters and independently driven variable speed cut off knives for receiving a web of paper and cutting it into sheets of variable width and length, variable speed independently driven carrier means for receiving the cut sheets and transporting them to a point of delivery, a throw out table underlying said carrier means having two sheet receiving areas each equal in length to the width of said carrier means, said table being adjustable transversely of said carrier means to bring either area thereof selectively into sheet receiving position, adjustable stops and division members cooperable with said table for setting up either of said areas thereof to provide compartments for reception of sheets of predetermined dimensions, and throw out means for optionally diverting sheets from said carrier means to said throw out table.

26. In apparatus of the character described, slitting and cutting means comprising adjustable slitters and independently driven variable speed cut off knives for receiving a web of paper and cutting it into sheets of variable width and length, a lay boy, variable speed independently driven carrier means for receiving the cut sheets and transporting and delivering them to said lay boy, the latter comprising two vertically adjustable tables each of a length to receive the sheets delivered from said carrier means and being adjustable to bring either of said tables selectively into sheet receiving position, a throw out table underlying said carrier means having two sheet receiving areas each equal in length to the width of said carrier means, said table being adjustable transversely of said carrier means to bring either area thereof selectively into sheet receiving position, adjustable stops and division members cooperable with said table for setting up either of said areas thereof to provide compartments for reception of sheets of predetermined dimensions, and throw out means for optionally diverting sheets from said carrier means to said throw out table.

27. In apparatus of the character described, means for receiving a web of paper and cutting it into sheets, a lay boy having a stacking table for the sheets, carrier means for receiving the cut sheets and transporting and delivering them to said table, ejectors at the delivery end of said carrier means restraining the central areas of the sheets against upward movement, and members disposed to lift the side portions of the sheets acting in cooperation with said ejectors to bow the sheets transversely as they are delivered to said table.

28. In apparatus of the character described, means for receiving a web of paper and cutting it into sheets, a lay boy having a stacking table for the sheets, carrier means for receiving the cut sheets and transporting and delivering them to said table, a driven shaft extending transversely of the delivery end of said carrier means, ejectors driven by said shaft adjustable lengthwise thereof and positionable over the central areas of the sheets, and members disposed to lift the side portions of the sheets acting in cooperation with said ejectors to bow the sheets transversely as they are delivered to said table.

29. In apparatus of the character described, means for receiving a web of paper and cutting it into sheets, a lay boy having a stacking table for the sheets, carrier means for receiving the cut sheets and transporting and delivering them to said table, said carrier means comprising a lower roll at the delivery end thereof over which the sheets are delivered, a driven shaft parallel with said roll disposed above and in back thereof, ejectors mounted on said shaft each comprising a frame and a forward pulley and a rearward pulley mounted thereon with a belt passing about said pulleys, said frame being pivoted on the rearward pulley and the latter being driven by and adjustable lengthwise of said shaft, the lower run of said belt being disposed to press upon the central area of a sheet passing over said roll, and lift fingers extending forwardly over said roll disposed to lift the sides of sheets passing over the roll.

30. In apparatus of the character described, means for receiving a web of paper and cutting it into sheets, a lay boy, carrier means for receiving the cut sheets and transporting and delivering them to said lay boy, the latter comprising two vertically adjustable tables each of a length to receive the sheets delivered from said carrier means and being adjustable transversely of said carrier means to bring either of said tables selectively into sheet receiving position, a throw out table underlying said carrier means, throw out means for optionally diverting sheets from said carrier means to said throw out table, normally lowered ejectors at the delivery end of said carrier means cooperating therewith for delivering the sheets to the lay boy table, and means for raising said ejectors into position to clear said lay boy during adjustment thereof.

31. In apparatus of the character described, means for receiving a web of paper and cutting it into sheets, a lay boy, carrier means for receiving the cut sheets and transporting and delivering them to said lay boy, the latter comprising two vertically adjustable tables each of a length to receive the sheets delivered from said carrier means, power means for independently adjusting said tables, power means for adjusting said lay boy transversely of said carrier means to bring either of said tables selectively into sheet receiving position, control means preventing overtravel of said lay boy with respect to said carrier means, control means preventing lowering of either of said tables except when it is in sheet receiving position, a throw out table underlying said carrier means, and throw out means for optionally diverting sheets from said carrier means to said throw out table.

32. In apparatus of the character described, means for receiving a web of paper and cutting it into sheets, a lay boy, carrier means for receiving the cut sheets and transporting and delivering them to said lay boy, the latter comprising two vertically adjustable tables each of a length to receive the sheets delivered from said carrier means, power means for independently adjusting said tables, power means for adjusting said lay boy transversely of said carrier means to bring either of said tables selectively into sheet receiving position, control means preventing overtravel of said lay boy with respect to said carrier means, control means preventing lowering of either of said tables except when it is in sheet receiving position, a throw out table underlying said carrier means, a sheet catcher's platform at the outer side of said lay boy, throw out means for optionally diverting sheets from said carrier means to said throw out table, operator controlled means on said platform for controlling lowering of either of said lay body tables when it is in sheet receiving position, and operator controlled means on said platform for controlling operation of said throw out means.

33. In apparatus of the character described, means for receiving a web of paper and cutting it into sheets, a lay boy, carrier means for receiving the cut sheets and transporting and delivering them to said lay boy, the latter comprising two vertically adjustable tables each of a length to receive the sheets delivered from said carrier means and being adjustable transversely of said carrier means to bring either of said tables selectively into sheet receiving position, a throw out table underlying said carrier means, throw out means for optionally diverting sheets from said carrier means to said throw out table, a sheet catcher's platform at the outer side of said lay boy, means controlled by an operator on said platform for lowering either of said lay boy tables when it is in sheet receiving position, and means controlled by an operator on said platform for controlling operation of said throw out means.

34. In apparatus of the character described, means for receiving a web of paper and cutting it into sheets, a lay boy, carrier means for receiving the cut sheets and transporting and delivering them to said lay boy, the latter comprising two vertically adjustable tables each of a length to receive the sheets delivered from said carrier means and being adjustable transversely of said carrier means to bring either of said tables selectively into sheet receiving position, a sheet catcher's platform at the outer side of said lay boy, and means controlled by an operator on said platform for controlling operation of said throw out means.

35. In apparatus of the character described, slitting and cutting means comprising adjustable slitters and independently driven variable speed cut off knives for receiving a web of paper and cutting it into sheets of variable width and length, a lay boy, variable speed independently driven carrier means for receiving the cut sheets and transporting and delivering them to said lay boy, the latter comprising two vertically adjustable tables each of a length to receive the sheets delivered from said carrier means and being adjustable transversely of the latter to bring either of said tables selectively into sheet receiving position, a throw out table underlying said carrier means having two sheet receiving areas each equal in length to the width of said carrier means, said throw out table being adjustable transversely of said carrier means to bring either area thereof selectively into sheet receiving position, throw out means for diverting sheets from said carrier means to said throw out table, a sheet catcher's platform at the outer side of and adjustable toward and away from said lay boy, means controlled by an operator on said platform for lowering either of said lay boy tables when it is in sheet receiving position, and means controlled by an operator on said platform for operating said throw out means.

36. In means for receiving cut sheets of paper board diverted from sheet carrier means, a throw out table having two areas each of a length to extend the full width of the carrier means, dividers independently adjustable lengthwise of the respective areas of said table, and stops independently adjustable transversely of the respective areas of said table, said dividers and said stops cooperating with said table to provide at the respective areas thereof compartments for reception of sheets of different widths and lengths.

37. In means for receiving cut sheets of paper board diverted from sheet carrier means, a transversely inclined throw out table having two areas each of a length to extend the full width of the carrier means, said table being provided in each area thereof with upwardly opening transverse grooves spaced apart lengthwise of said table, dividers seating on said table having elements engaging over the upper edge thereof and independently adjustable lengthwise of the respective areas of said table, and stops extending upward from the table having arms disposed in said grooves, said table and the arms of said stops having cooperating means detachably and adjustably securing the arms to said table at the respective areas thereof.

38. In means for receiving cut sheets of paper board delivered thereto from sheet carrier means, a lay boy having two vertically adjustable sheet stacking tables each of a length equal to the width of the carrier means, power means for raising either of said tables selectively, a motor, and means operated by said motor for lowering either of said tables.

39. In means for receiving cut sheets of paper board delivered thereto from sheet carrier means, a lay boy having two sheet stacking tables each of a length equal to the width of the carrier means, winding shafts at the ends of the respective tables, flexible suspension members windable onto and off of said shafts for independently raising and lowering said tables, a drive shaft extending lengthwise of each table having driving connection to the winding shafts thereof, motors individual to said drive shafts normally disconnected therefrom, means for optionally establishing driving connection between the respective motors and drive shafts for driving the latter in winding direction, and means for driving either of said drive shafts selectively in unwinding direction.

40. In means for receiving cut sheets of paper board delivered thereto from sheet carrier means, a lay boy having two sheet stacking tables each of a length equal to the width of the carrier means, winding shafts at the ends of the respective tables, flexible suspension members windable onto and off of said shafts for independently raising and lowering said tables, a drive shaft extending lengthwise of each table having driving connection to the winding shafts thereof, said drive shafts being coaxial with their inner ends adjacent each other, motors individual to said drive shafts normally disconnected therefrom, means for optionally establishing driving connection between the respective motors and drive shafts for driving the latter in winding direction, ratchet wheels secured on the inner ends of said drive shafts, a third motor, pawls individual to said ratchet wheels and cooperating therewith for turning the respective drive shafts in unwinding direction, said pawls being continuously reciprocated by said third motor, and means for normally holding said pawls out of engagement with said ratchet wheels and for moving either of said pawls selectively into cooperating relation to its ratchet wheel.

41. In means for receiving cut sheets of paper board delivered thereto from sheet carrier means, a lay boy having two sheet stacking tables each of a length equal to the width of the carrier means, winding shafts at the ends of the respective tables, flexible suspension members windable onto and off of said shafts and attached to said tables for raising and lowering them, a drive shaft extending lengthwise of each table having driving connection to the winding shafts thereof, motors individual to said drive shafts normally disconnected therefrom, means for optionally establishing driving connection between the respective motors and drive shafts for driving the latter in table raising direction, and means for driving either of said drive shafts selectively in table lowering direction.

LAWRENCE A. MOORE.

REFERENCES CITED

The following references are of record in the file of this patent:

UNITED STATES PATENTS

| Number | Name | Date |
|---|---|---|
| 2,318,937 | Goldney et al. | May 11, 1943 |